(12) United States Patent
Singer et al.

(10) Patent No.: US 10,777,985 B2
(45) Date of Patent: Sep. 15, 2020

(54) POWER OUTLETS FOR BENCHES

(71) Applicant: POINT POD PTY. LTD., Kenmore (AU)

(72) Inventors: Cameron James Singer, Kenmore (AU); Daniel Peter Freund, Kenmore (AU); Christopher Graham Conway Lamb, Kenmore (AU)

(73) Assignee: POINT POD PTY. LTD., Kenmore (AU)

( * ) Notice: Subject to any disclaimer, the term of this patent is extended or adjusted under 35 U.S.C. 154(b) by 0 days.

(21) Appl. No.: 16/471,385

(22) PCT Filed: Dec. 20, 2017

(86) PCT No.: PCT/AU2017/051427
§ 371 (c)(1),
(2) Date: Jun. 19, 2019

(87) PCT Pub. No.: WO2018/112534
PCT Pub. Date: Jun. 28, 2018

(65) Prior Publication Data
US 2020/0052474 A1    Feb. 13, 2020

(30) Foreign Application Priority Data

Dec. 20, 2016 (AU) .................. 2016905283
Oct. 18, 2017 (AU) .................. 2017904209

(51) Int. Cl.
| | | |
|---|---|---|
| *H02G 3/18* | (2006.01) | |
| *A47B 21/06* | (2006.01) | |
| *H01R 25/00* | (2006.01) | |

(52) U.S. Cl.
CPC .............. *H02G 3/18* (2013.01); *A47B 21/06* (2013.01); *H01R 25/006* (2013.01); *A47B 2021/068* (2013.01)

(58) Field of Classification Search
CPC .. H02G 3/18; H01R 25/006; A47B 2021/068; A47B 21/06
See application file for complete search history.

(56) References Cited

U.S. PATENT DOCUMENTS 4,616,285 A * 10/1986 Sackett ............... H01R 13/703
                                                                                 174/53
5,069,632 A * 12/1991 Avitan ............... H01R 13/7036
                                                                                439/188

(Continued)

FOREIGN PATENT DOCUMENTS

| DE | 102007051053 A1 | 8/2008 |
| EP | 2 806765 A2 | 12/2014 |
| WO | WO-2015171731 A1 | 11/2015 |

OTHER PUBLICATIONS

V3M: Automatic Pop Up Power Outlet [retrieved from internet on Nov. 6, 2017] <URL: https://web.archive.org/web/2017042210026/ https://modernpowersolutions.com.au/online-store/popup-powerpoint-australia-electrical-outlet-v3-motorised/>.

(Continued)

*Primary Examiner* — Abdullah A Riyami
*Assistant Examiner* — Nader J Alhawamdeh
(74) *Attorney, Agent, or Firm* — Shackelford, Bowen, McKinley & Norton, LLP; David L. Odom

(57) ABSTRACT

A concealable power outlet assembly for bench mounting including:
- a housing for mounting fast with an underside of the bench;
- a power outlet sub-assembly slideably received by the housing and including an upper portion;
- a sensor responsive to operative force applied to the upper portion;
- an extension assembly including an electric actuator responsive to the sensor for sliding the power outlet (Continued)

sub-assembly relative to the housing in response to application of force to the upper portion to thereby bring said sub-assembly to an extended configuration or to a retracted configuration.

15 Claims, 23 Drawing Sheets

(56) References Cited

U.S. PATENT DOCUMENTS

| | | | |
|---|---|---|---|
| 7,163,409 B1 | 1/2007 | Chen et al. | |
| 7,626,120 B1 | 12/2009 | Golden et al. | |
| 9,635,931 B2 | 5/2017 | Mandon et al. | |
| 2006/0094299 A1* | 5/2006 | Ewing | H01R 9/226 |
| | | | 439/652 |
| 2008/0001510 A1* | 1/2008 | Gershfeld | A47B 21/06 |
| | | | 312/223.3 |
| 2014/0342589 A1* | 11/2014 | Lin | H01R 13/5213 |
| | | | 439/142 |
| 2015/0320203 A1 | 11/2015 | Mandon et al. | |

OTHER PUBLICATIONS

Gosh, Aurobindo, "International Search Report for PCT/AU2017/051427" dated Mar. 5, 2018, 5 pages.

Ghosh, Aurobindo, "Notification of Transmittal of Inernational Preliminary Report on Patentabiity" dated Oct. 15, 2018, 12 pages.

Ghosh, Aurobindo, "Written Opinion of the International Searching Authority", dated Mar. 5, 2018, 7 pages.

Bedrooms Plus: "M4TEC (TM) Motorised Pop Up Power USB Socket with Bluetooth Audio", Apr. 2, 2016 (Apr. 2, 2016). p. 1, XP054979636, Retrieved from the Internet: URL:https://www.youtube.com/watch?v=IRB4hX TmlaQ.

Ibarrondo, Borja, "Supplementary European Search Report for PCT/US2017051427" dated Sep. 9, 2019.

* cited by examiner

POWER OUTLETS FOR BENCHES

TECHNICAL FIELD

The present invention concerns a concealable power outlet assembly (referred to herein as a "CPOA") for a bench such as a kitchen bench.

BACKGROUND ART

Any references to methods, apparatus or documents of the prior art are not to be taken as constituting any evidence or admission that they formed, or form part of the common general knowledge.

General purpose power outlets for mounting into a bench, such as a kitchen bench are known in the prior art. For example, FIGS. 1 to 3 illustrate a known concealable power outlet assembly (COPA) 1. The COPA 1 consists of a plurality of power outlet sockets 3a, 3b, 3c, which are mounted on a frame 4 that is comprised of two vertical rails, 5a, 5b, fastened together by a header 7 and a jamb 9. The power outlet sockets 3a, 3b, 3c are provided with power by an electrical cable 8. A cover plate 11 is fastened to the header by a spring loaded catch stem 13. Pushing down on the cover plate 11 causes the stem to unlatch and telescope upwardly as indicated by arrow 2 so that the cover plate 11 pops up and may be grasped for purposes of lifting the frame 4.

A sleeve 17 is provided that has an upper circumferential flange 19. The sleeve has a thread around its outside which threadedly receives a nut 21. With reference to FIG. 2, in order to install the COPA 1 a hole 10 is drilled through the bench top 23 which the sleeve 17 is then inserted through as shown so that the underside of the flange 19 rests on the top of the bench surrounding the hole. The frame 4 is then inserted through the sleeve 17 so that the outlying underside of the cover plate 11 rests on the flange 19 surrounding the hole 10. The nut 21 is then tightened to cause the sleeve 17 to compress a little around the frame 4 so that the frame can be pulled up by the cover plate 11 and will remain in place once pulled up by virtue of friction between the vertical rails 5a, 5b of the frame and the inside surface of the sleeve 17. FIG. 3 shows the frame once it has been pulled up by the cover plate 11 to thereby make GPOs 3a, 3b, 3c accessible above the bench 23 for use. When the time comes to conceal the frame 4 it is pushed back down again by applying downward force on the cover plate 11 sufficient to overcome the static friction between the sleeve and the rails 5a, 5b.

It is an object of the present invention to provide a concealable power outlet assembly for mounting on a bench-top which is an improvement to the previously described concealable power outlet assembly of the prior art and which is convenient for a user to operate.

SUMMARY OF THE INVENTION

According to a first embodiment of the present invention there is provided a concealable power outlet assembly for bench mounting including:
- a housing for mounting fast with an underside of the bench;
- a power outlet sub-assembly slideably received by the housing and including an upper portion;
- a sensor responsive to operative force applied to the upper portion;
- an extension assembly including an electric actuator responsive to the sensor for sliding the power outlet sub-assembly relative to the housing in response to application of force to the upper portion to thereby bring said sub-assembly to an extended configuration or to a retracted configuration.

Preferably there is provided a biasing arrangement spacing the sensor from the upper portion in the absence of the operative force wherein upon application of operative force to the holder the biasing arrangement is overcome for operation of the sensor by the upper portion.

The sensor may comprise a load cell. Alternatively the sensor may be comprise a switch such as a push button switch which may be a momentary switch that includes integrated biasing.

Preferably the upper portion of the power outlet sub-assembly includes a holder for holding a portion of bench material flush with an upper side of the bench.

The assembly may further include a mounting plate, for example cover 140 as illustrated in FIG. 13A, wherein the biasing arrangement comprises a number of resilient supports fast with the mounting plate.

Preferably the mounting plate includes a recess in which the sensor is located and hole may be formed through the recess so that a printed circuit board bearing a control circuit mounted to an underside of the mounting plate can be placed in electrical communication with the sensor.

The power outlet sub-assembly includes an extrusion that slides within the housing and the mounting plate is mounted atop the extrusion.

Preferably the housing includes a collar with a flange and a tubular body and wherein in use the flange is adhered to the underside of the bench and the tubular body is clamped to the collar whereby the tubular body is rotatable to a desired angle relative to the flanged collar prior to clamping thereto.

In a preferred embodiment of the present invention the electric actuator comprises a motor drives a pinion that meshes with a rack.

The electric motor may be mounted in the power outlet sub assembly and the rack may be mounted to the housing.

The power outlet sub-assembly preferably comprises first and second rails that respectively cooperate with first and second guides disposed along internal walls of the housing.

The power outlet sub-assembly further includes a spacing member that holds the first and second rails apart.

The spacing member preferably comprises said extrusion and is preferably an an arcuate extrusion.

A base-plate may be mounted to the arcuate extrusion for adding rigidity thereto.

The base plate is formed with an opening therethrough for passage of electrical wiring.

A number of electrical outlets of the power outlet sub-assembly may be disposed between opposed sides of the rails.

Preferably electrical outlets of the power outlet sub-assembly comprise one or more of a general purpose outlet (GPO); electrical sockets; data network ports.

According to another aspect of the present invention there is provided a concealable power outlet assembly for bench mounting including:
- a housing for mounting fast with the bench;
- a power outlet sub-assembly slideably received by the housing and extendable therefrom; and
- a mechanical biasing assembly comprising a compressed gas strut or as they are sometimes called a "gas spring" although other types of biasing assembly are possible, for example a coil spring about a spindle might be used in other embodiments of the invention.

In a preferred embodiment of the invention a push-actuated latch is disposed between the housing and the power outlet sub-assembly whereby in a retracted configuration exerting downward force upon the power outlet sub-assembly causes the latch to unlatch so that the biasing member forces said sub-assembly to slide away from the housing to thereby bring the power outlet sub-assembly to extend above the bench for use.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
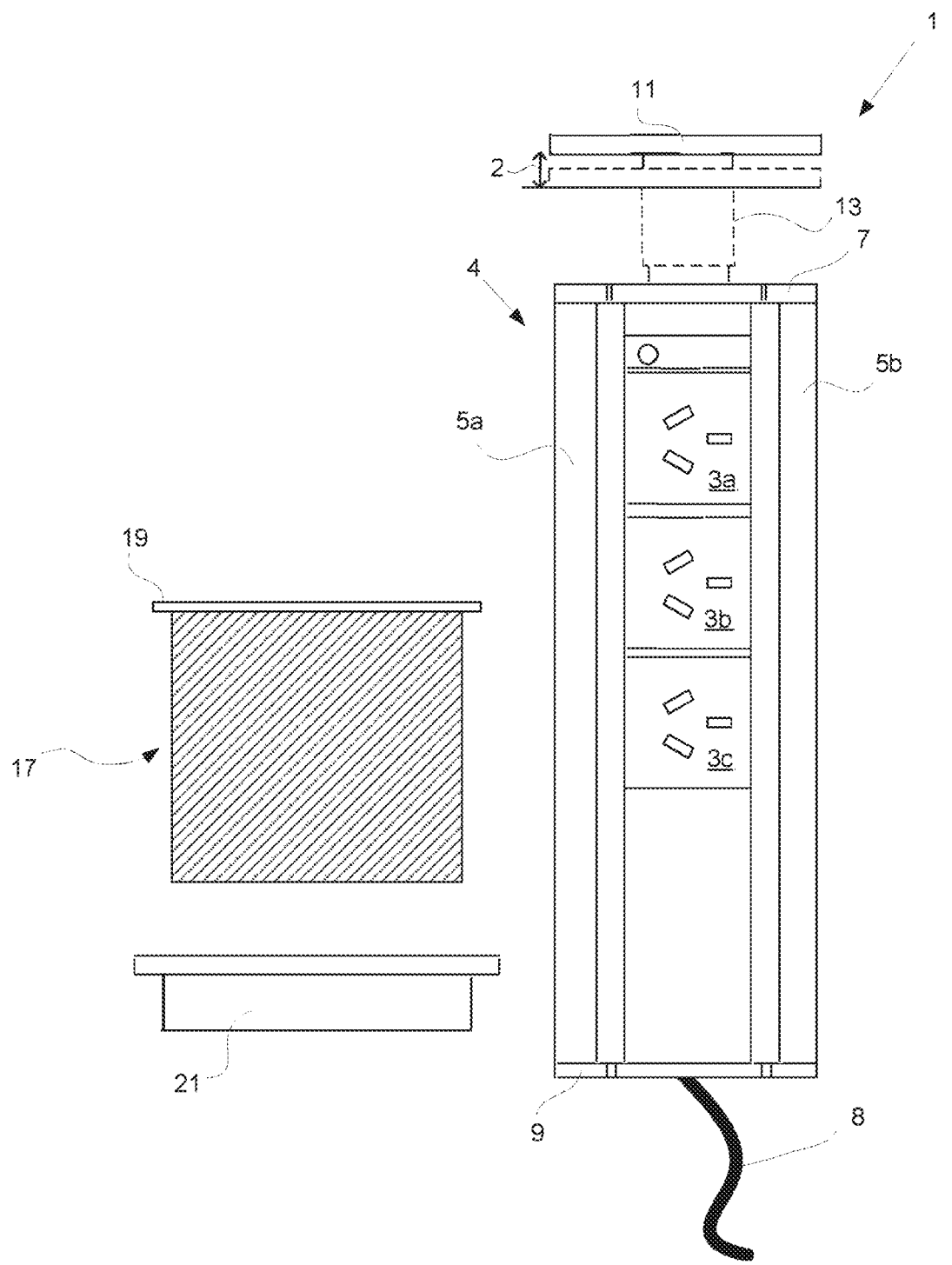
FIG. 1 illustrates various parts of a prior art concealable power outlet assembly (CPOA).
Figure 2:
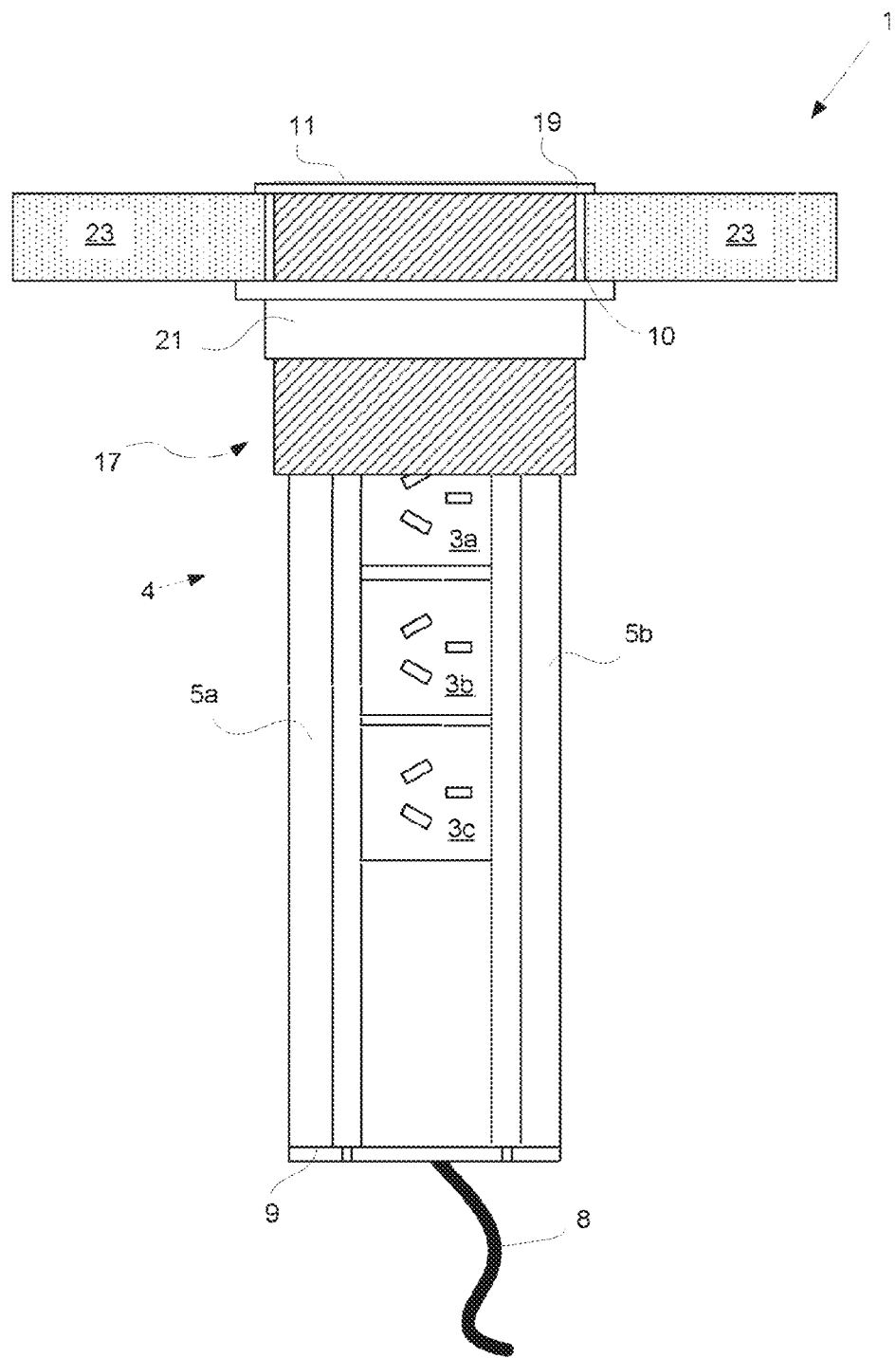
FIG. 2 illustrates the prior art CPOA of FIG. 1 assembled and installed in a bench and shown in a retracted configuration.
Figure 3:
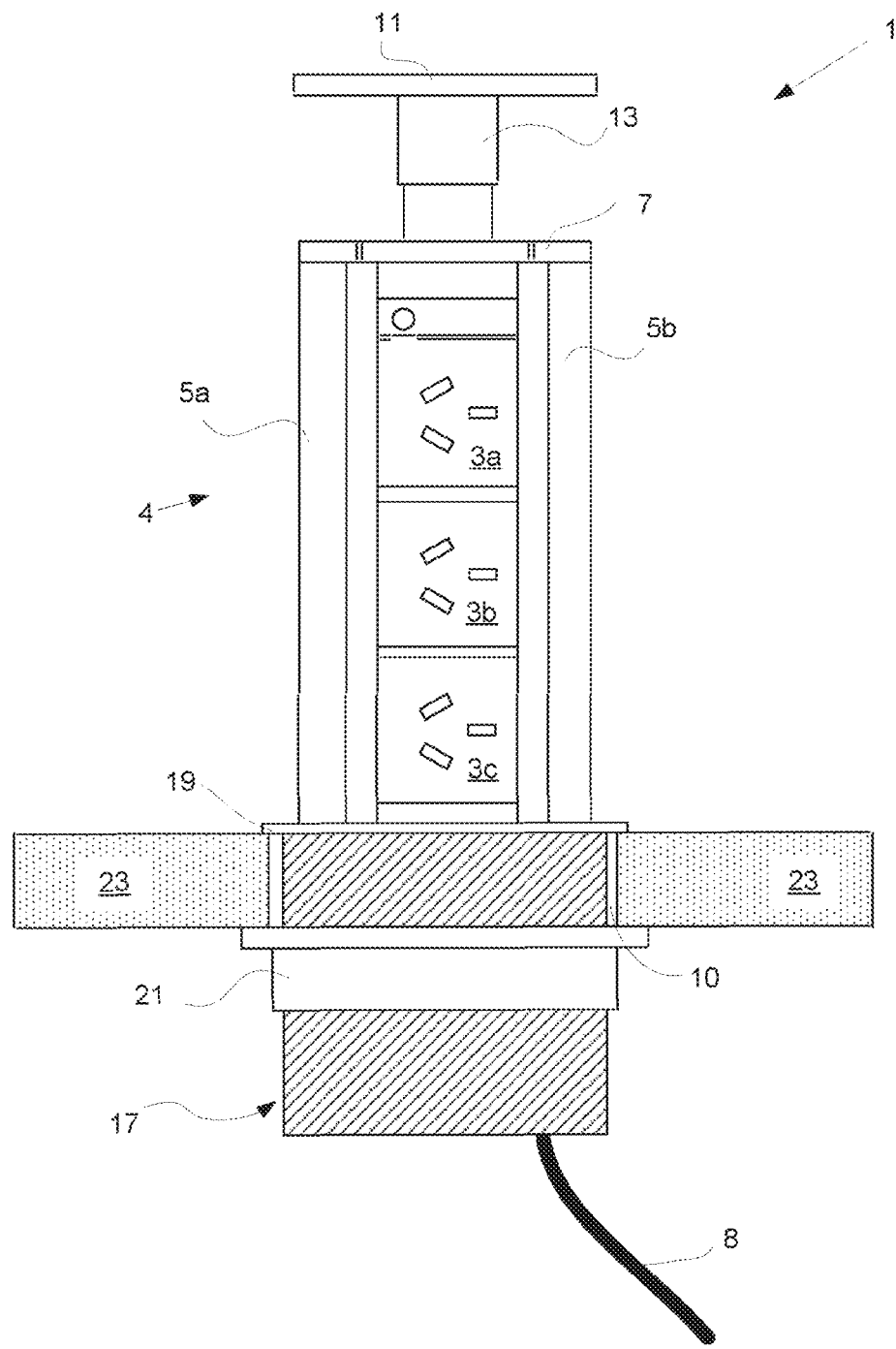
FIG. 3 depicts the CPOA of FIG. 2 in an extended configuration.
Figure 4:
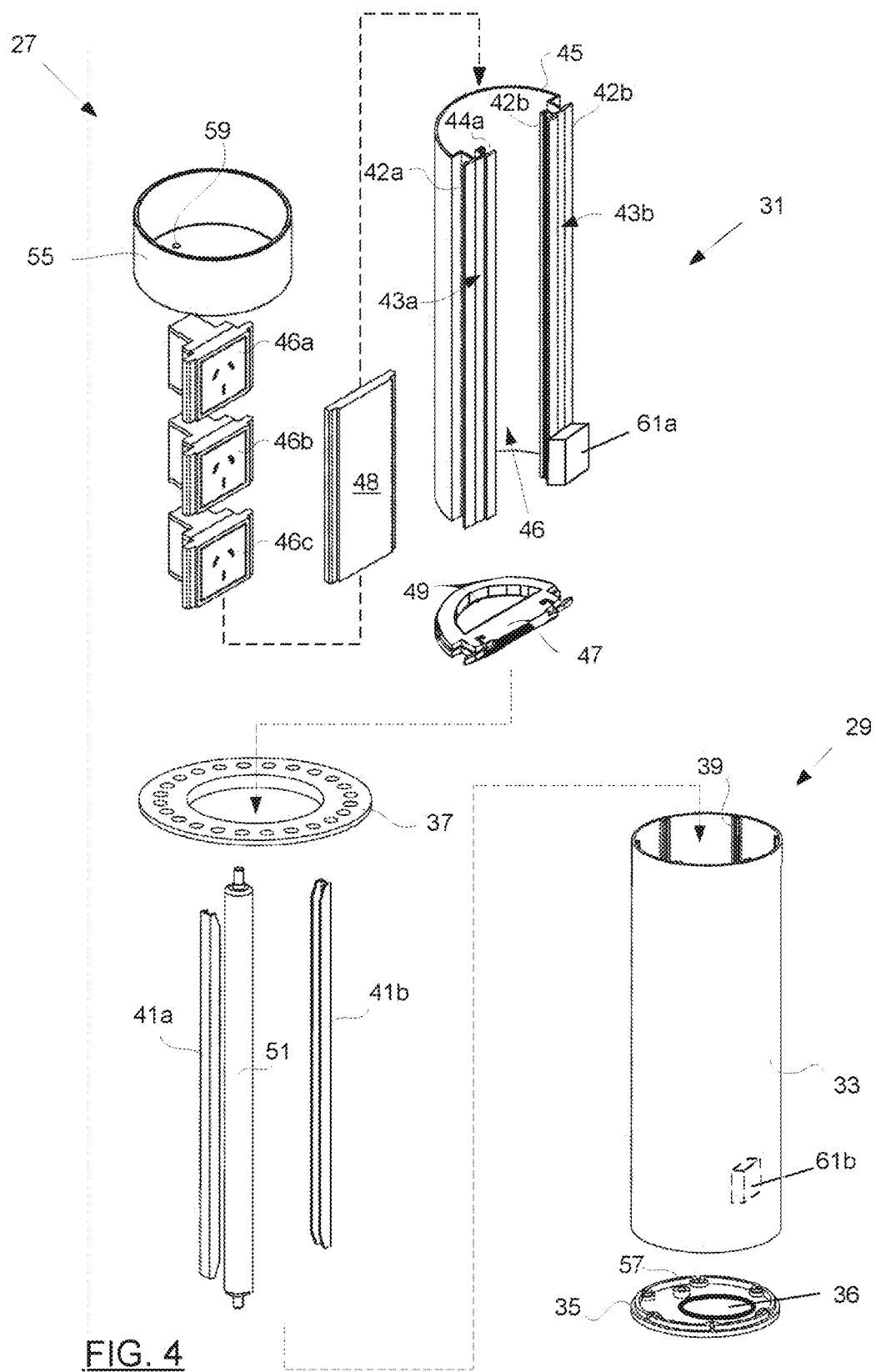
FIG. 4 is an exploded view of a CPOA according to a first embodiment of the present invention.
Figure 7:
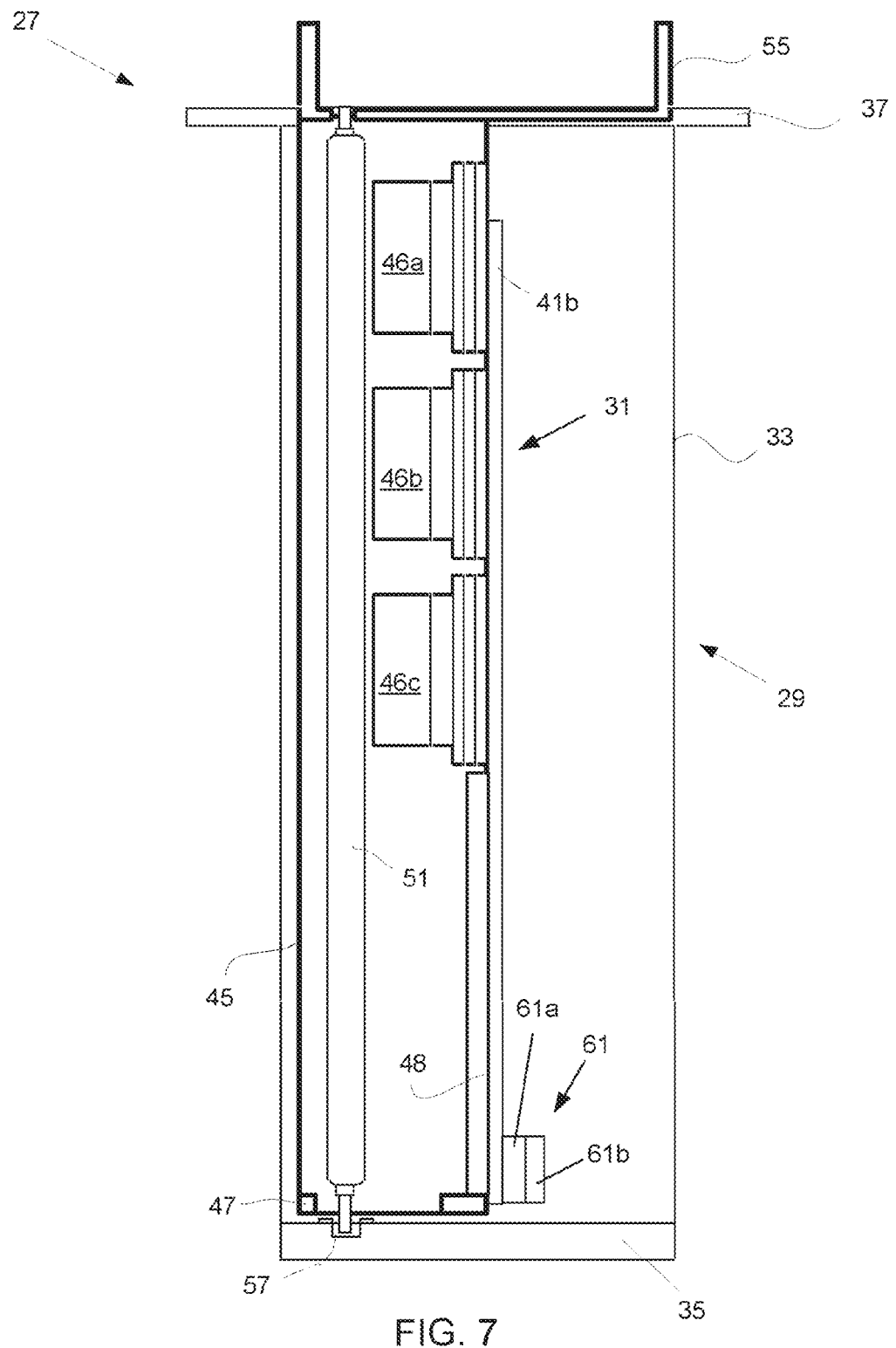
FIG. 7 is an assembled, partially cutaway side view of the CPOA of FIG. 4 in a retracted configuration.

Referring now to FIG. 4 a concealable power outlet assembly (CPOA) 27 according to an embodiment of the present invention is shown in exploded view. FIG. 7 is an assembled, partially cutaway side view of the CPOA 27 in a retracted configuration.

Broadly speaking, the CPOA 27 is comprised of a housing 29 for mounting fast with a bench and a power outlet sub-assembly 31 that is slideably received by the housing 29.

Figure 5:
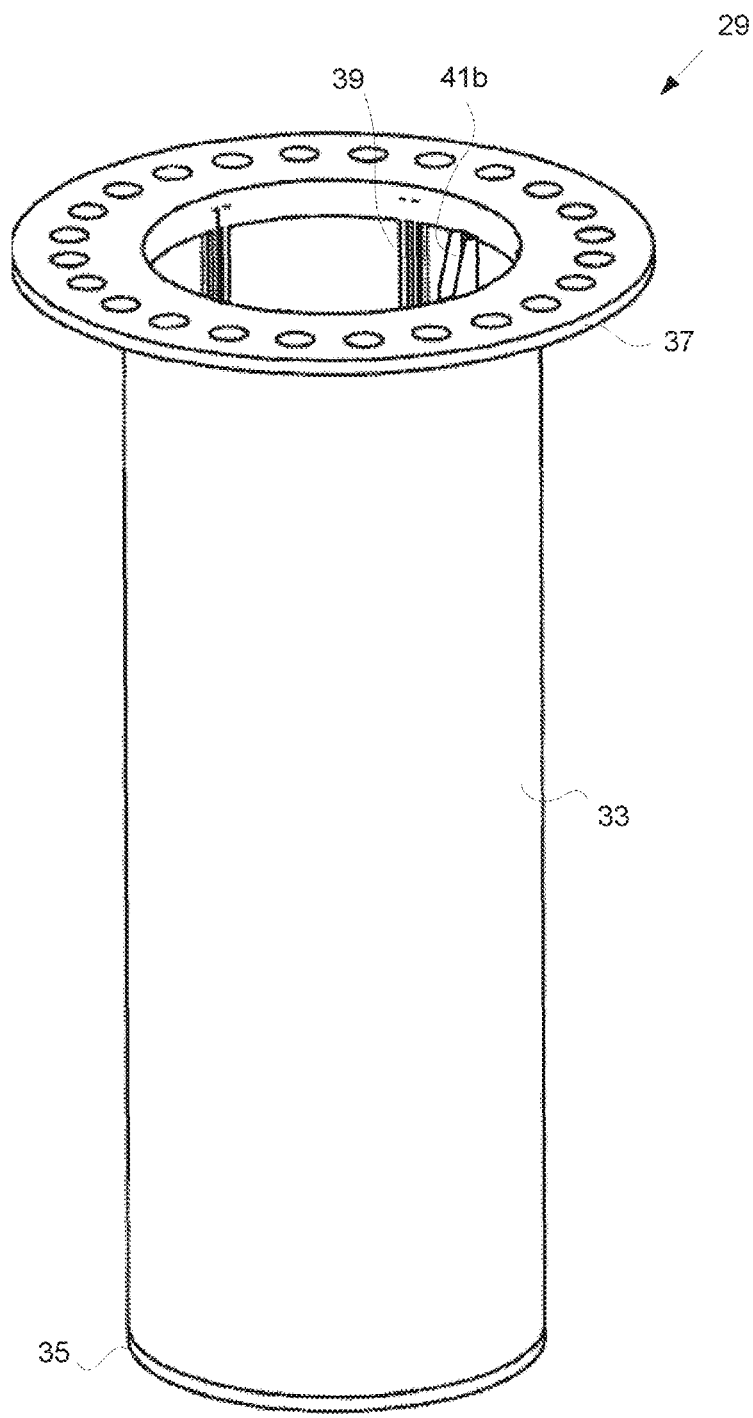
FIG. 5 is a view of a housing of the CPOA of FIG. 4.

The housing 29 is comprised of housing tube 33, a circular baseplate 35, which is fastened to the bottom of the tube 33 and a mounting flange 37 that is fastened to the upper edge of the tube 33. The housing tube 33 is formed as an extrusion with longitudinal internal channels 39 that assist in the fastening of the circular baseplate at the bottom of the tube 33 and the mounting flange 37 at the top. The housing further includes opposed first and second elongate guides 41a and 41b which are disposed oppositely along the internal wall of the housing tube 33. An assembled view of the housing is provided in FIG. 5.

Figure 6:
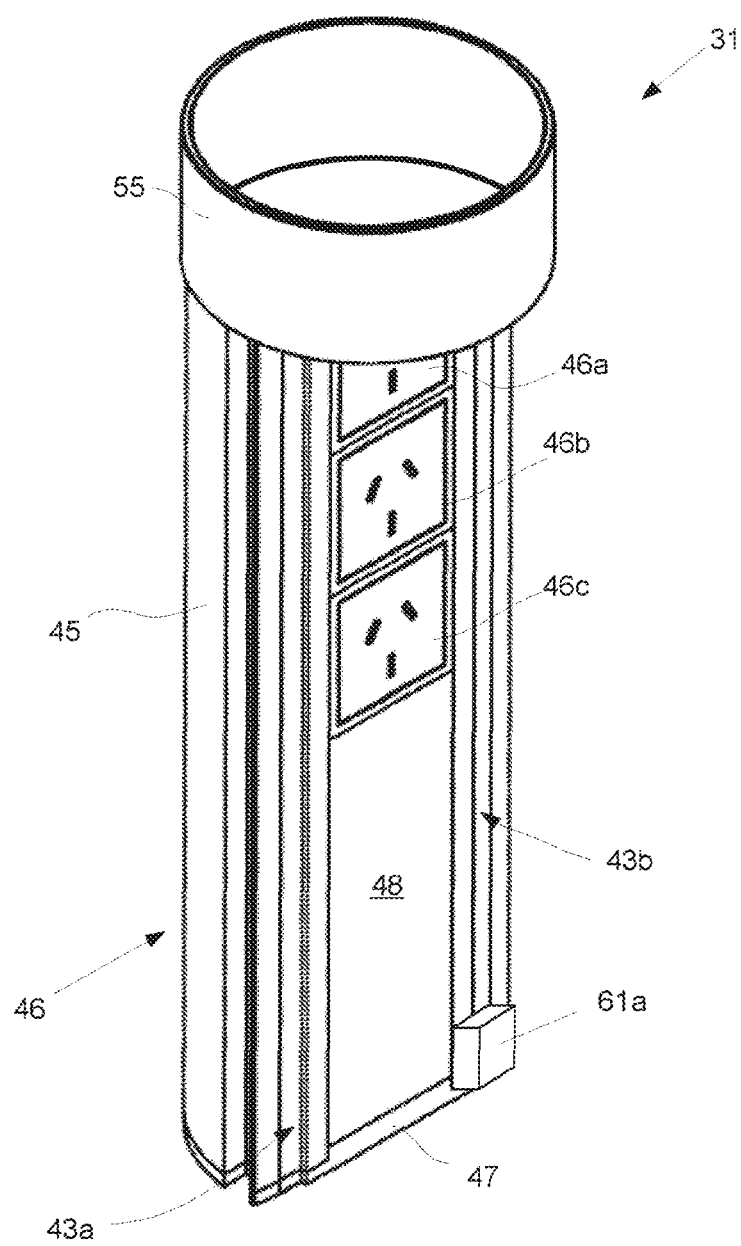
FIG. 6 is a view of a power outlet sub-assembly of the CPOA of FIG. 4.

Returning again to FIG. 4, the power outlet sub-assembly 31, which is shown in assembled view in FIG. 6, comprises first and second vertical rails 43a, 43b. A spacing member in the form of arcuate extrusion 45 attaches to and holds the first and second rails apart. The rails 43a, 43b have outer edges 42a, 42b, which respectively ride along the first and second guides 41a, 41b that are disposed along the internal wall of the housing tube 33. Inner edges of the rails 43a, 43b are formed as opposed elongate slots for retaining outer edges of GPO sockets 46a, 46b, 46c and blanking plate 48. In the presently described preferred embodiment of the invention the arcuate extrusion 45 and the first and second rails 43a. 43n are integrally formed as a single-piece slider extrusion 46.

A semicircular base-plate 47 fastens to the bottom edge of the slider extrusion 46 for adding rigidity thereto. The semicircular base plate 47 is formed with an opening 49 therethrough. As will be seen, the opening 49 allows for passage of a compressed gas strut 51 therethrough and also for passage of an electrical cable 53 (shown in FIG. 12) which provides electrical power to the GPOs 46a, 46b, 46c. Similarly, the circular baseplate 35 is also formed with an opening 36 for passage of electrical cable 53.

While only GPOs are present in the presently described preferred embodiment of the invention other types of the electrical outlets may be used. Indeed any or more of general purpose outlet (GPO) electrical sockets, data network ports such as Ethernet ports and universal synchronous bus (USB) power outlets may be incorporated, for example.

A receptacle in the form of cup 55 is fastened to the top of the slider extrusion 46. As will be explained during installation of the CPOA 27 a disk of material of the bench may be placed in the cup 55 so that a seamless appearance is provided when the CPOA 27 is in the retracted configuration.

The gas compression strut 51 comprises a biasing assembly which is disposed between the housing tube baseplate 35 and the cup 55. Opposed ends of the strut 51 are located into corresponding receptacles 57 and 59 formed into the housing tube baseplate 35 and the cup 55 respectfully.

As best seen in FIG. 7, a two-part push-actuated latch 61 is disposed between the housing and the power outlet sub-assembly. The latch 61 is comprised of a first part 61a which is fastened to rail 43b and a second part 61b, which is fastened to the inside wall of the tubular housing 33. Push actuated latches are known in the prior art. They latch when the two parts are brought together and they release in response to one part being moved relative to the other in a predetermined direction. In the retracted configuration, as shown in FIGS. 7, 8, 9, wherein the power outlet subassembly 31 is withdrawn down into the housing and latched in place, exerting downward force upon the power outlet sub-assembly causes the first part 61a of the latch 61 to move downward relative to the second part 61b so that they unlatch.

Figure 10:
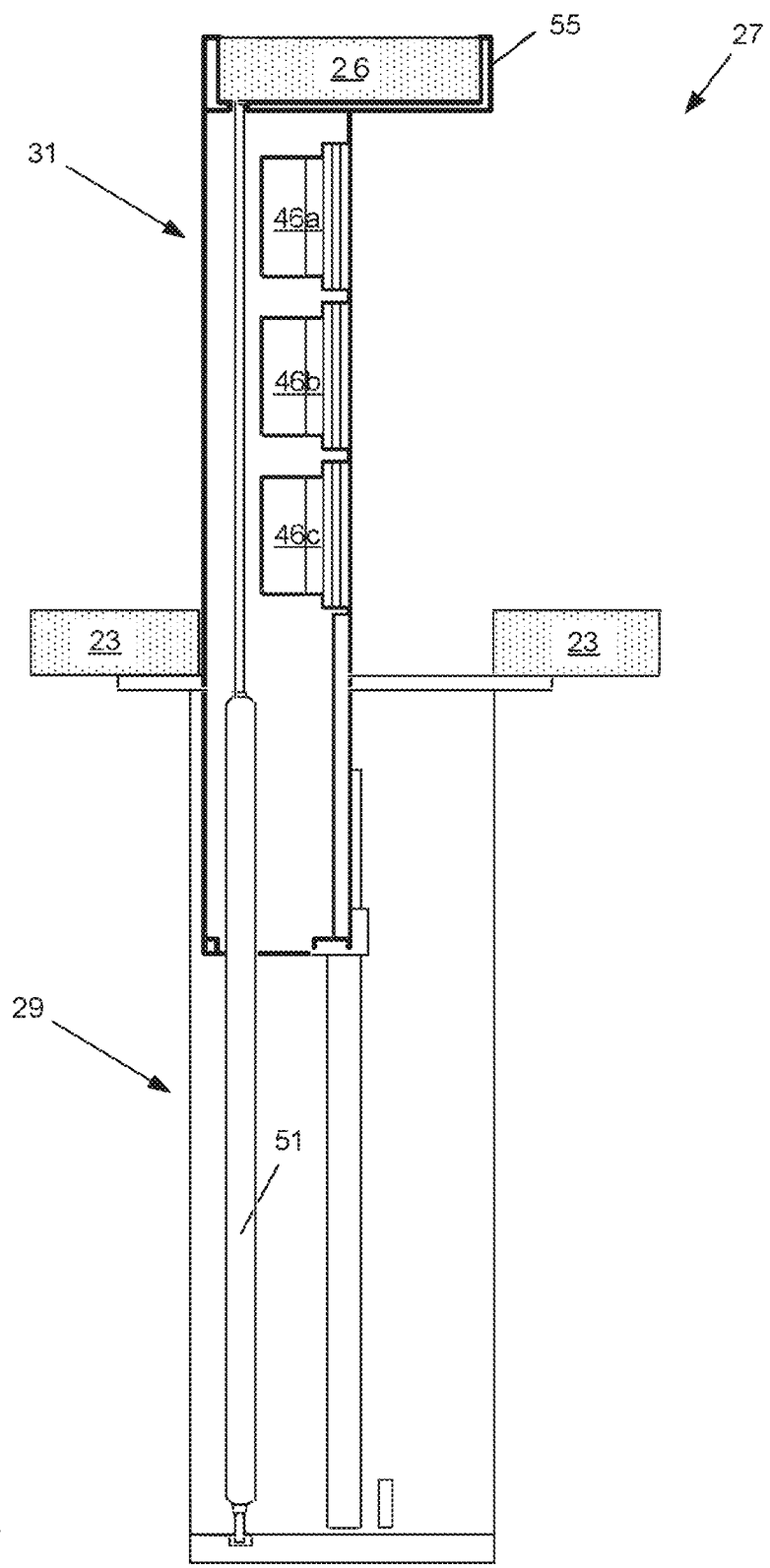
FIG. 10 is a side view of the CPOA of FIGS. 8 and 9 in an extended configuration.
Figure 11:
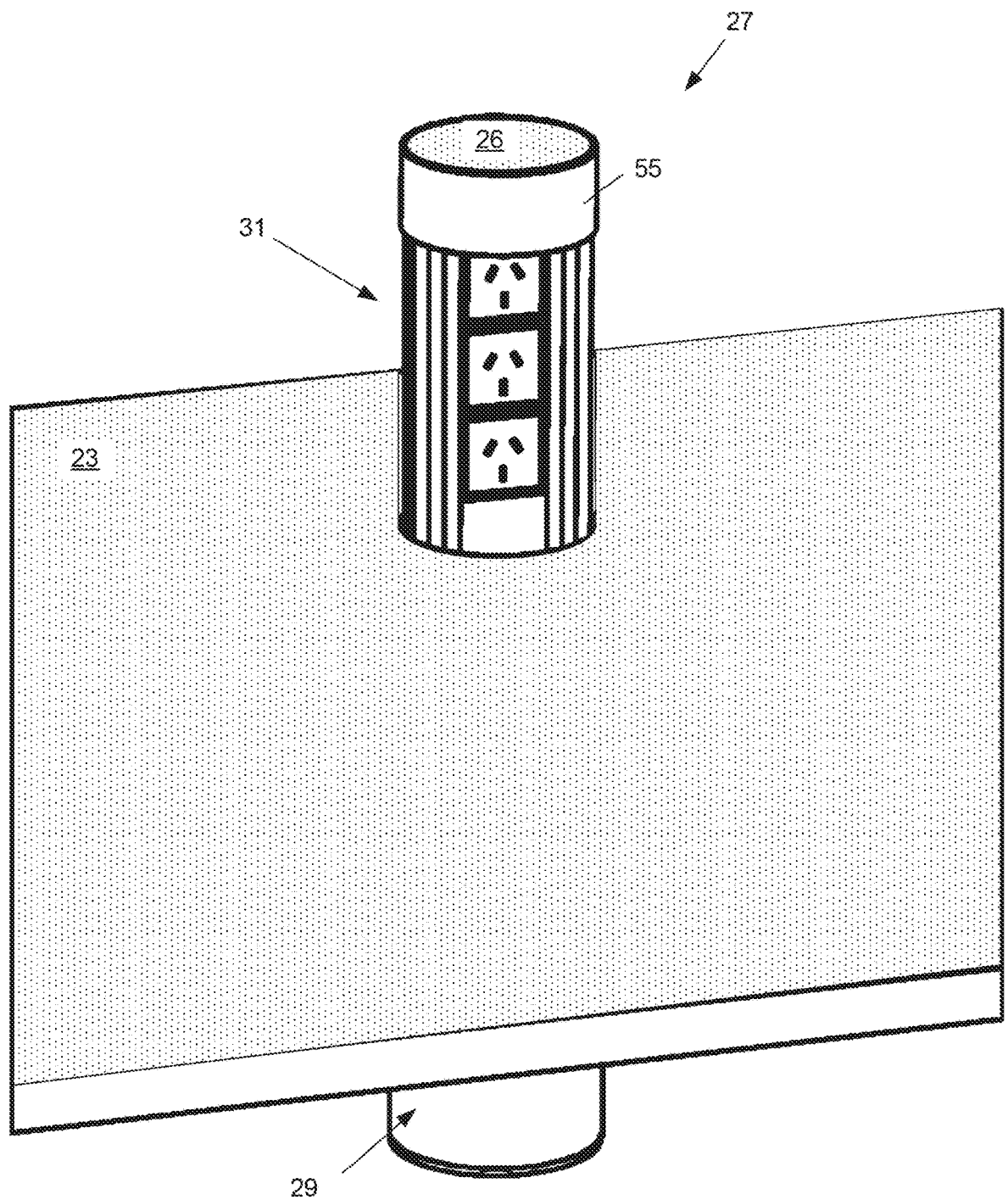
FIG. 11 is a view of the bench top showing the CPOA of FIGS. 8 and 9 in the extended configuration.

Once unlatched the compression strut 51 is free to extend thereby forcing the sub-assembly 31 to slide up and away from the housing 29 to thereby bring the power outlet sub-assembly to extend above the bench 23 for use as shown in FIGS. 10 and 11.

Figure 7A:
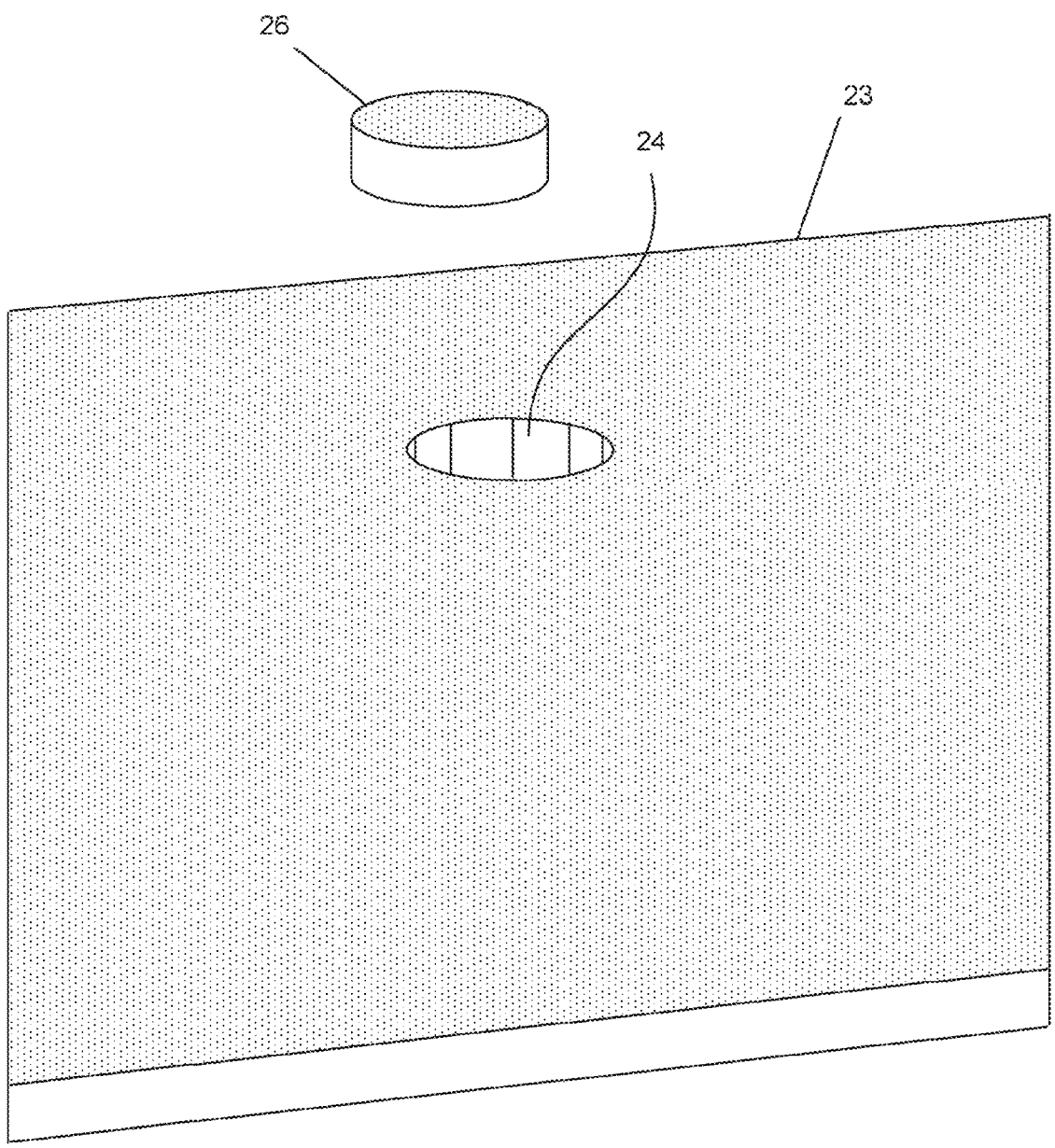
FIG. 7A shows a bench that has been prepared for installation of the CPOA of FIG. 4.

With reference to FIG. 7A, in order to install the CPOA 27 in a bench 23 a tradesperson firstly makes a hole 24 corresponding to the inner diameter of the tubular housing 33 through the bench. Depending on how the hole is cut it may produce a disk of bench material 26 which is suitable for placement in the cup 55 as shown in FIG. 8. Alternatively, the disk of bench material 26 may be produced separately, for example in the factory where the bench is manufactured.

Figure 8:
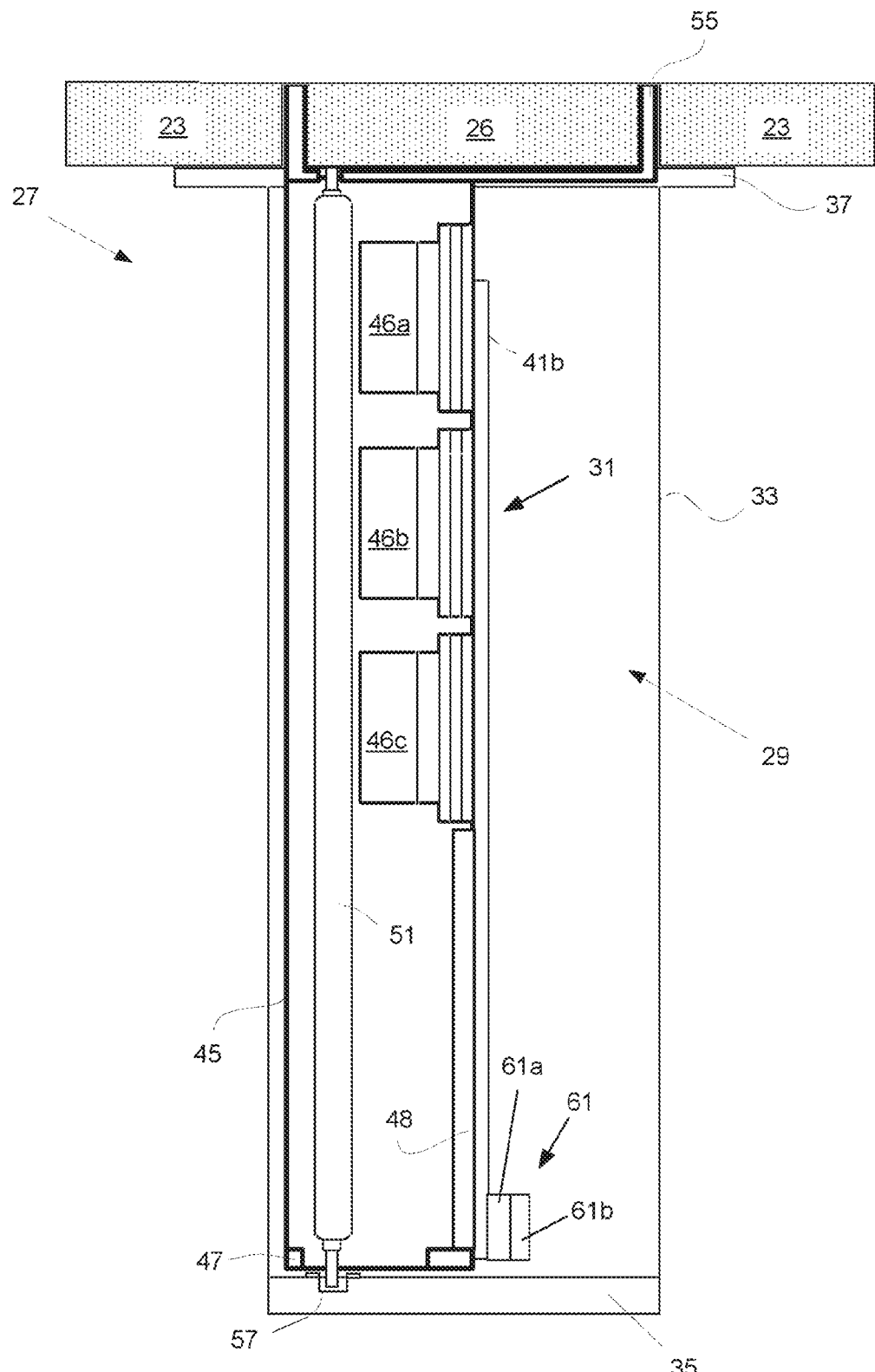
FIG. 8 shows the CPOA of FIG. 7 installed to the bench.
Figure 9:
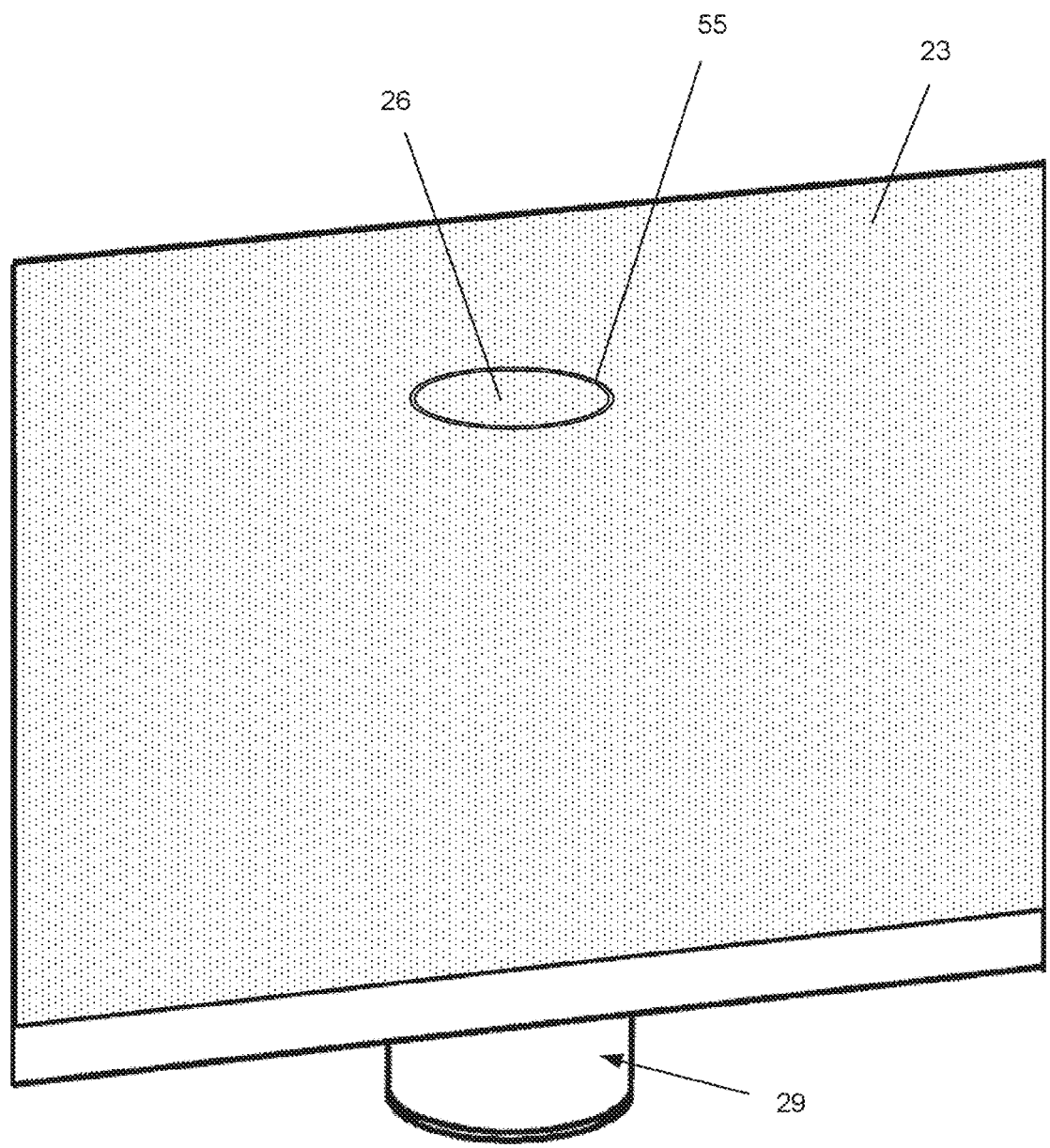
FIG. 9 is a view of the bench top with the CPOA installed and in the retracted configuration.

The flange 37 of the housing is fastened to the underside of the bench about the hole 24 as shown in FIG. 8. Electrical power cable 53 (visible in FIG. 12) is connected to the premise's power supply in order to supply electricity to the GPOs 46a, 46b, 46c. FIG. 9 is a view of the top of the bench 23 with the CPOA 27 installed and shown in the retracted configuration. It will be observed that since the cup 55 holds a disk 26 of the bench material the overall impression of the bench top is that it is virtually seamless and the installation of the CPOA 27 makes little visual impact in the retracted configuration, which is highly desirable.

Figure 12:
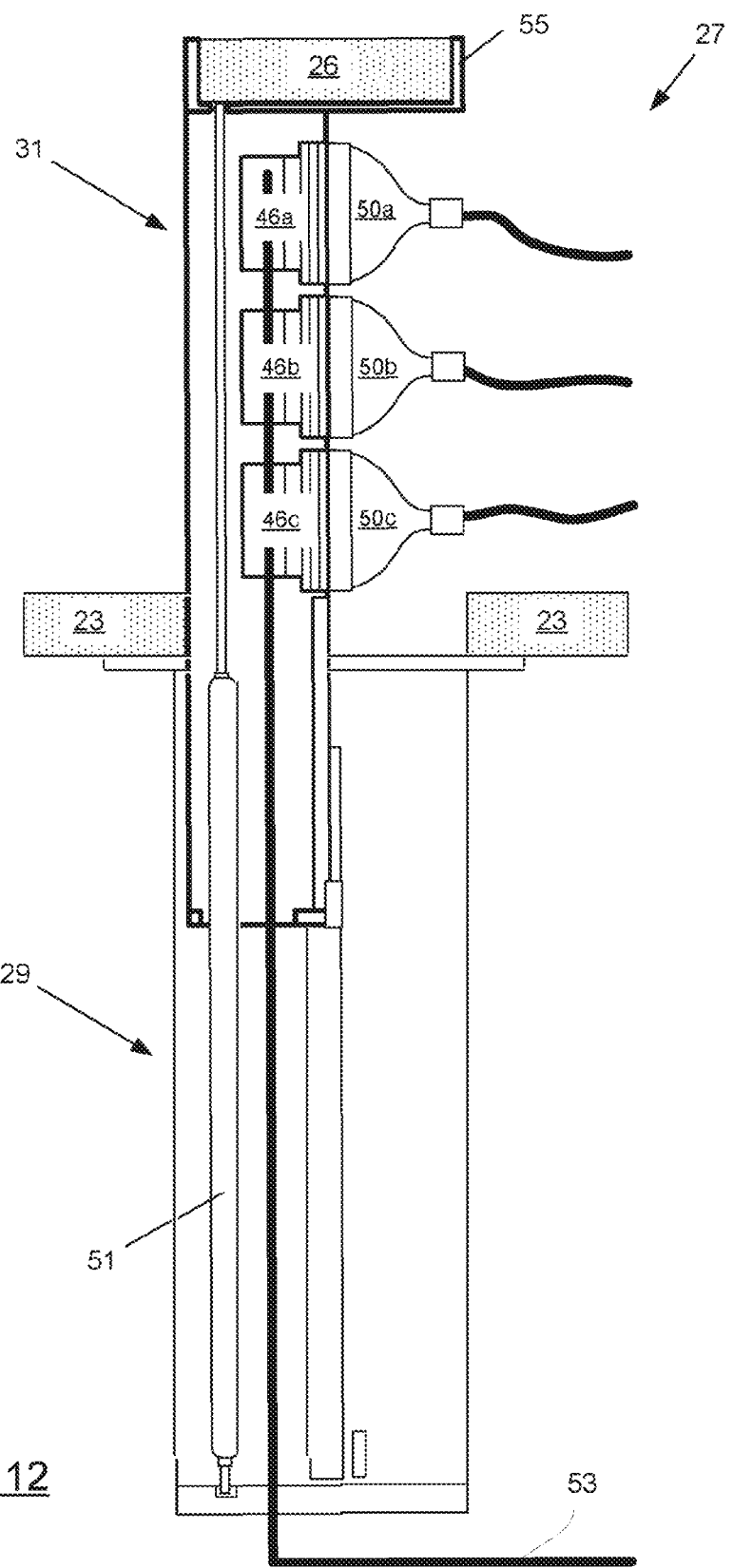
FIG. 12 shows the CPOA of FIGS. 8 and 9 in the extended configuration in use with a number of power plugs connected thereto.

Upon pushing down on the disk of bench material 26, which is located in the cup 55, the latch releases and so the CPOA is brought to the extended configuration that is shown in FIGS. 10 and 11. In the extended configuration the GPOs are accessible and can receive power plugs 50a, 50b, 50c for appliances as shown in FIG. 12.

When it is time to return to the retracted configuration the power plugs 50a, 50b, 50c are removed and downward force is then applied to the disk 26 and hence the cup 55 that is sufficient to overcome the gas strut 51 and so push the power outlet sub-assembly 31 back into the housing 27 until the two parts 61a, 61b of the latch 61 catch each other.

Figure 13:
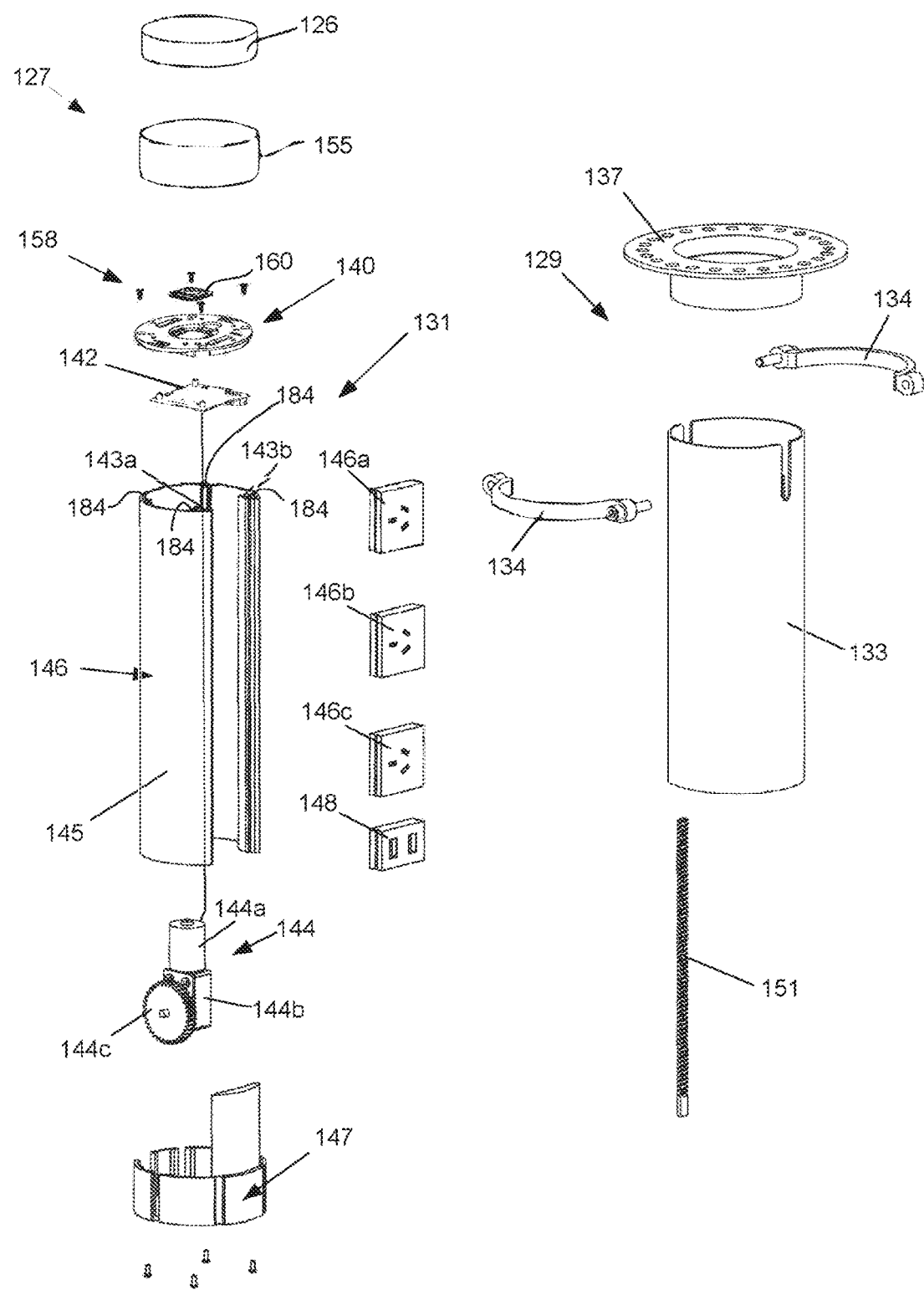
FIG. 13 is an exploded view of a CPOA according to a preferred embodiment of the invention.
Figure 13A:
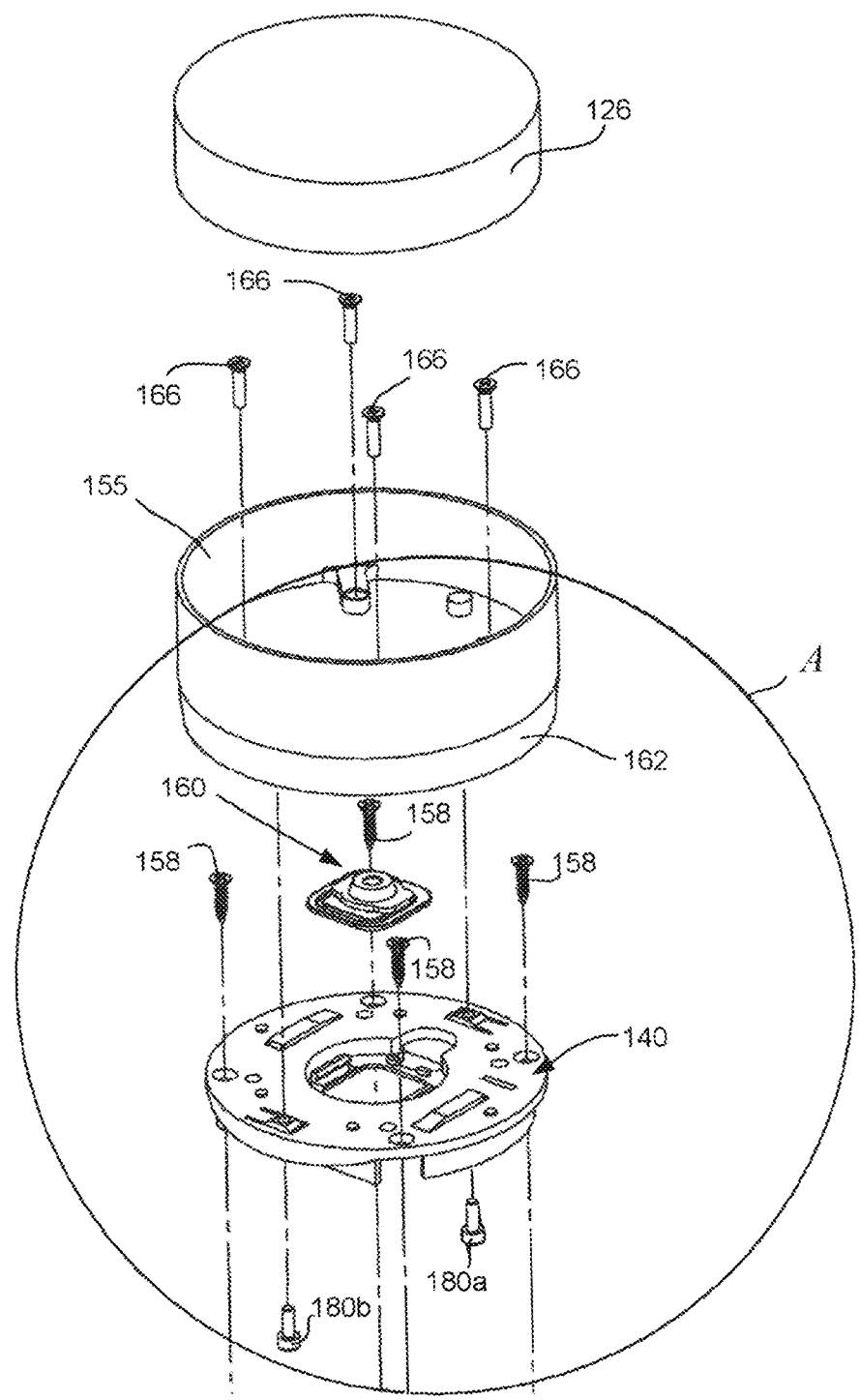
FIG. 13A is a detail view of a portion of the exploded view of FIG. 13.
Figure 13B:
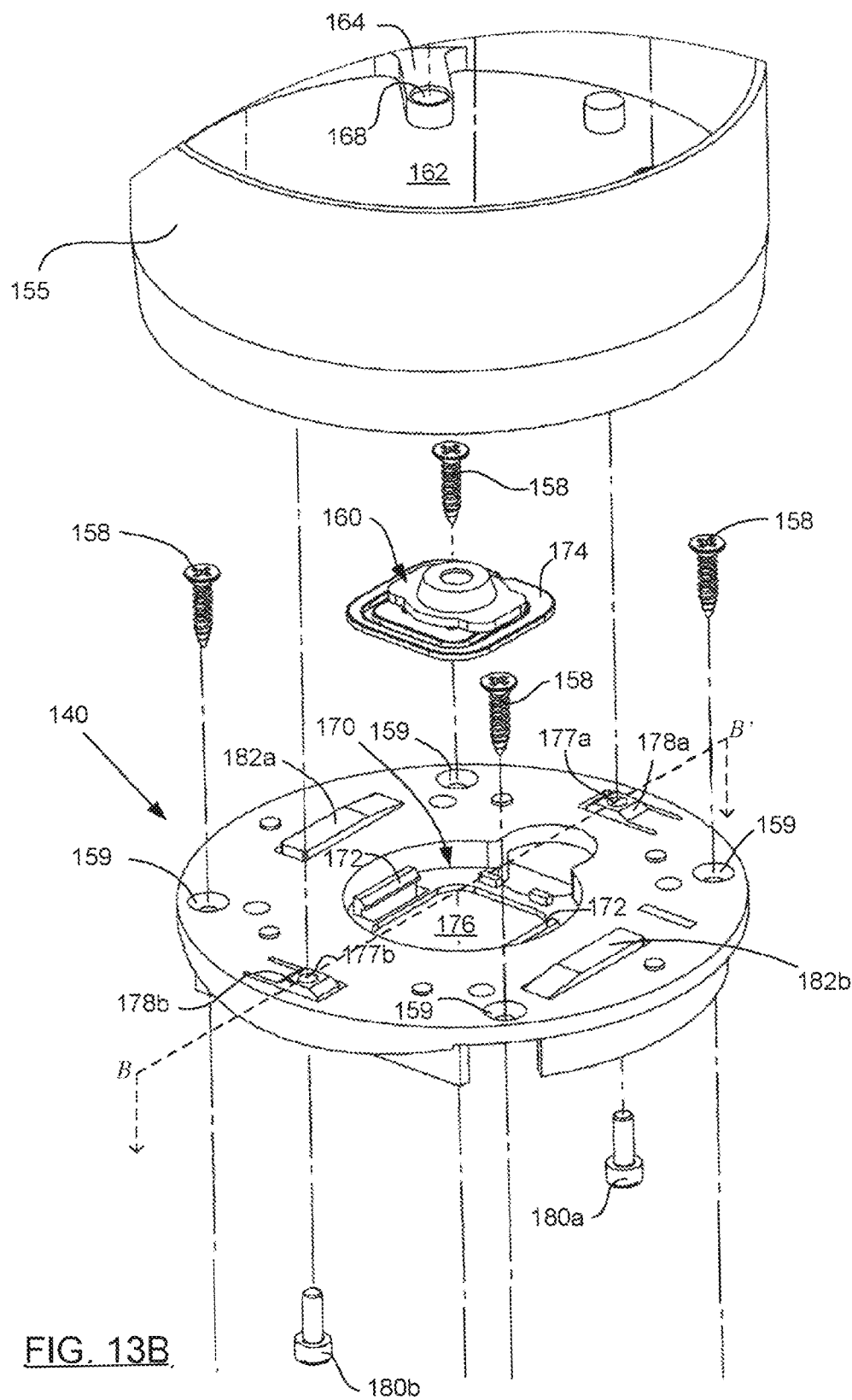
FIG. 13B is an enlarged view of a circled region of FIG. 13A.
Figure 14:
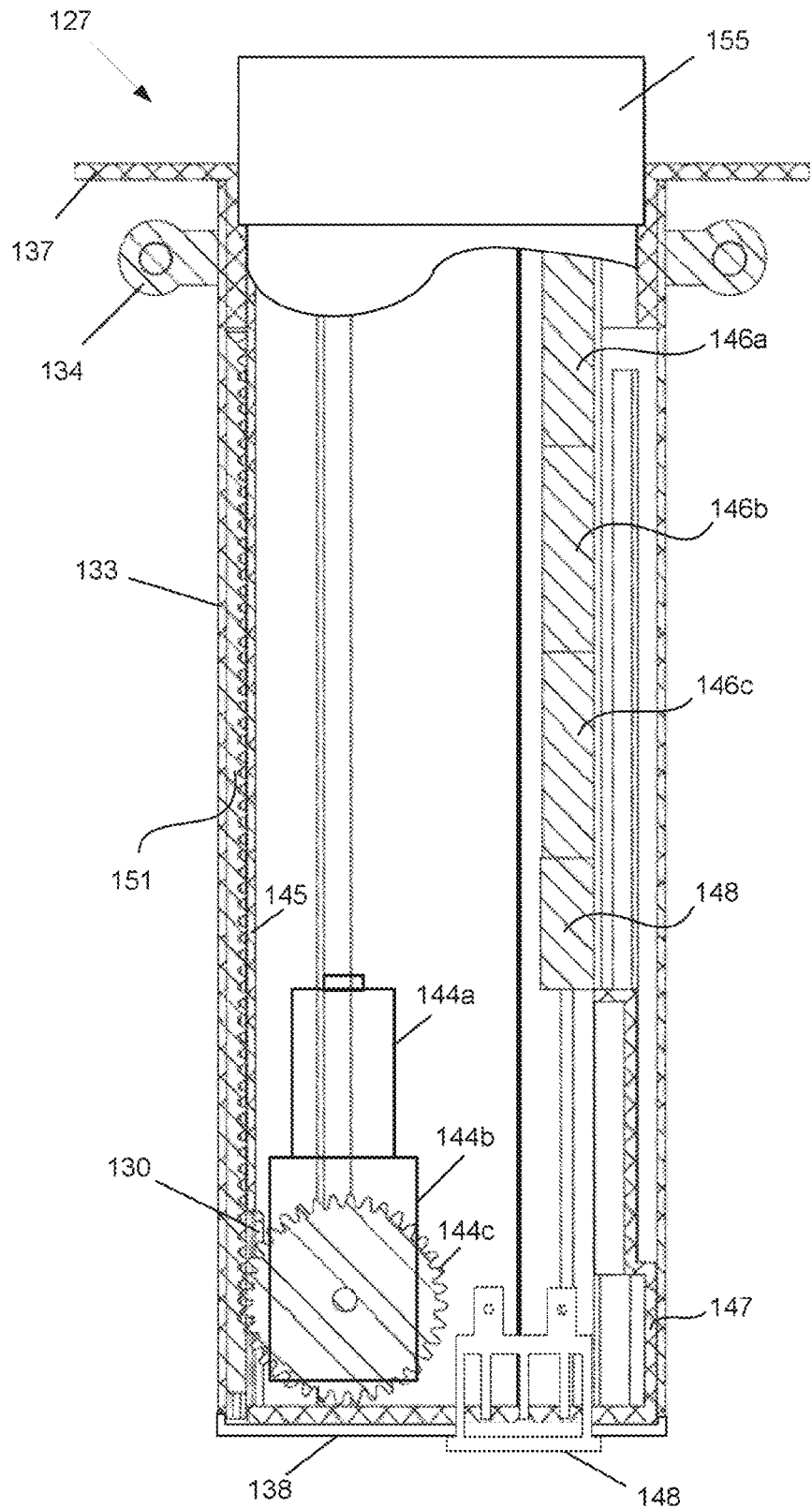
FIG. 14 is a partial cross-sectional view of the CPOA of FIG. 13 in a retracted configuration.

Referring now to FIG. 13 a concealable power outlet assembly (CPOA) 127 according to a second and preferred embodiment of the present invention is shown in exploded view. FIGS. 13A, 13B and 10 show various components in more detail. FIG. 14 is an assembled, partially cutaway side view of the CPOA 127 in a retracted configuration.

Broadly speaking, the CPOA 127 is comprised of a housing 129 for mounting fast with a bench and a power outlet sub-assembly 131 that is slideably received by the housing 129.

The housing 129 is comprised of housing tube 133, and a mounting flange 137 that has a collar portion that is clamped within the upper end of the tube 133 by means of screw-tightened clamp ring 134 (shown in two parts in FIG. 13). A rack 151 is fastened longitudinally along the inner wall of the tube 133. The housing tube 133 is formed with a longitudinal slot 139 (best seen in FIG. 15), closed at upper and lower ends that receives an outward protrusion from the power outlet sub-assembly 131 to thereby guide the assembly as it slides within the tube 133. An assembled view of the housing, shown in use, is provided in FIG. 16. A bottom plate 139 (FIGS. 14, 15, 16) closes the lower extremity of the tube 133. A mains electricity power socket 148 is mounted through the bottom plate 139.

Figure 17:
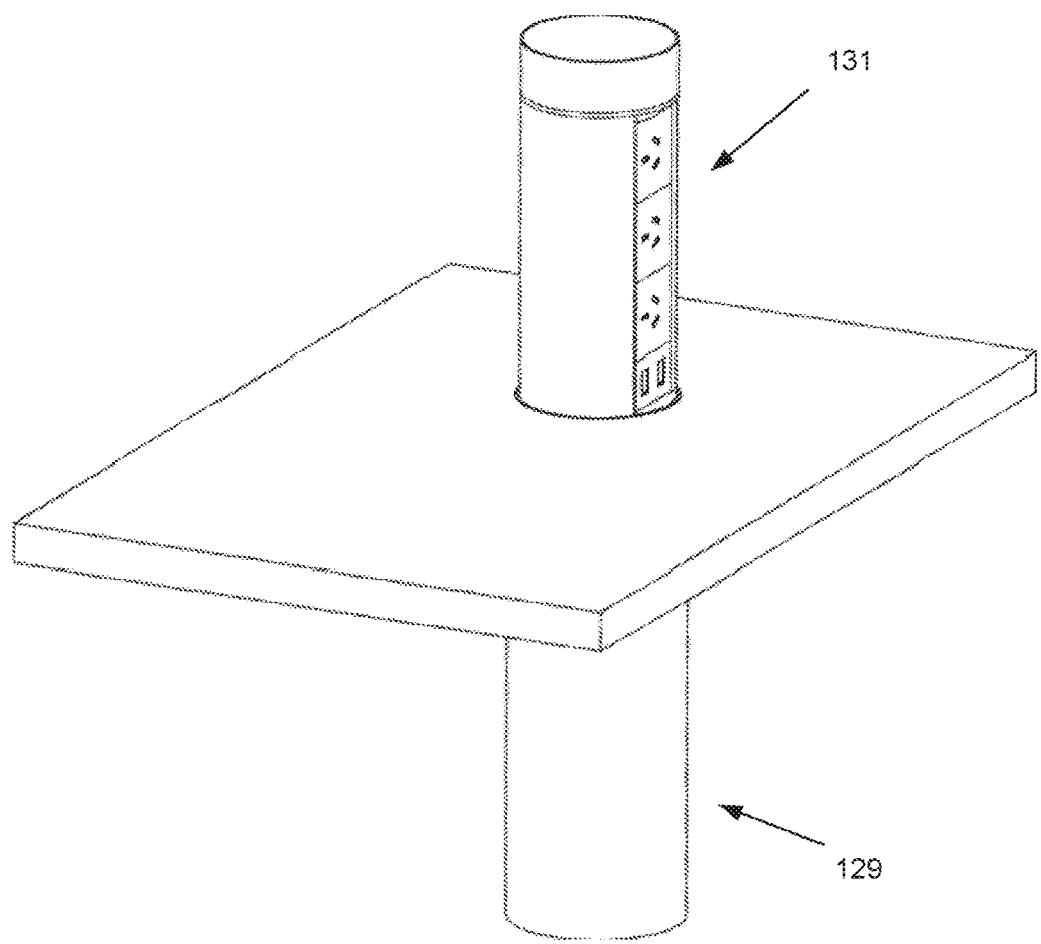
FIG. 17 Is a view of the bench top showing the CPOA of FIGS. 15A and 16 in the extended configuration.

Returning again to FIG. 13, the power outlet sub-assembly 131, which is shown extending from a benchtop in use in FIG. 17, comprises first and second vertical rails 143a, 143b. Inner edges of the rails 143a, 143b are formed as opposed elongate slots for retaining outer edges of GPO sockets 146a, 146b, 146c and USB outlet 148. In the presently described preferred embodiment of the invention the arcuate extrusion 145 and the first and second rails 143a 143b are integrally formed as a single-piece slider extrusion 146.

A base-plate 147 is fastened to the bottom edge of the slider extrusion 146 for adding rigidity thereto and for supporting a powered pinion assembly 144. The powered pinion assembly 144 comprises an electric motor 144a, pinion 144c and bevel gear box 144b interconnecting a drive shaft of the electric motor and the pinion 144c. The electric motor 144a comprises one type of electrically operated actuator that may be used to move the power outlet subassembly 127 relative to the housing 129. For example in other embodiments of the invention one or more solenoids may be used. The baseplate 147 is formed with an opening therethrough that allows for passage of an electrical cable from power socket 148 (shown in FIGS. 14, 15, 16) which provides electrical power to the GPOs 146a, 146b, 146c and printed circuit board 142.

A receptacle is provided in the form of cup 155 which, as will be explained in more detail shortly, is fastened over a circular cover 140 that closes the top of the slider extrusion 146. The cover 140 is formed with a central recess in which a load cell 160 locates. Printed circuit board 142 is mounted to the underside of cover 140 and electrically connected to the load cell 160 through a hole 176 formed through the central recess 170 of the cover 140. The printed circuit board 142 interconnects components comprising a control circuit for the motor and also a power supply circuit for converting the mains power to low voltage direct current for operation of the control circuit, the motor and the USB socket 148.

Figure 13C:
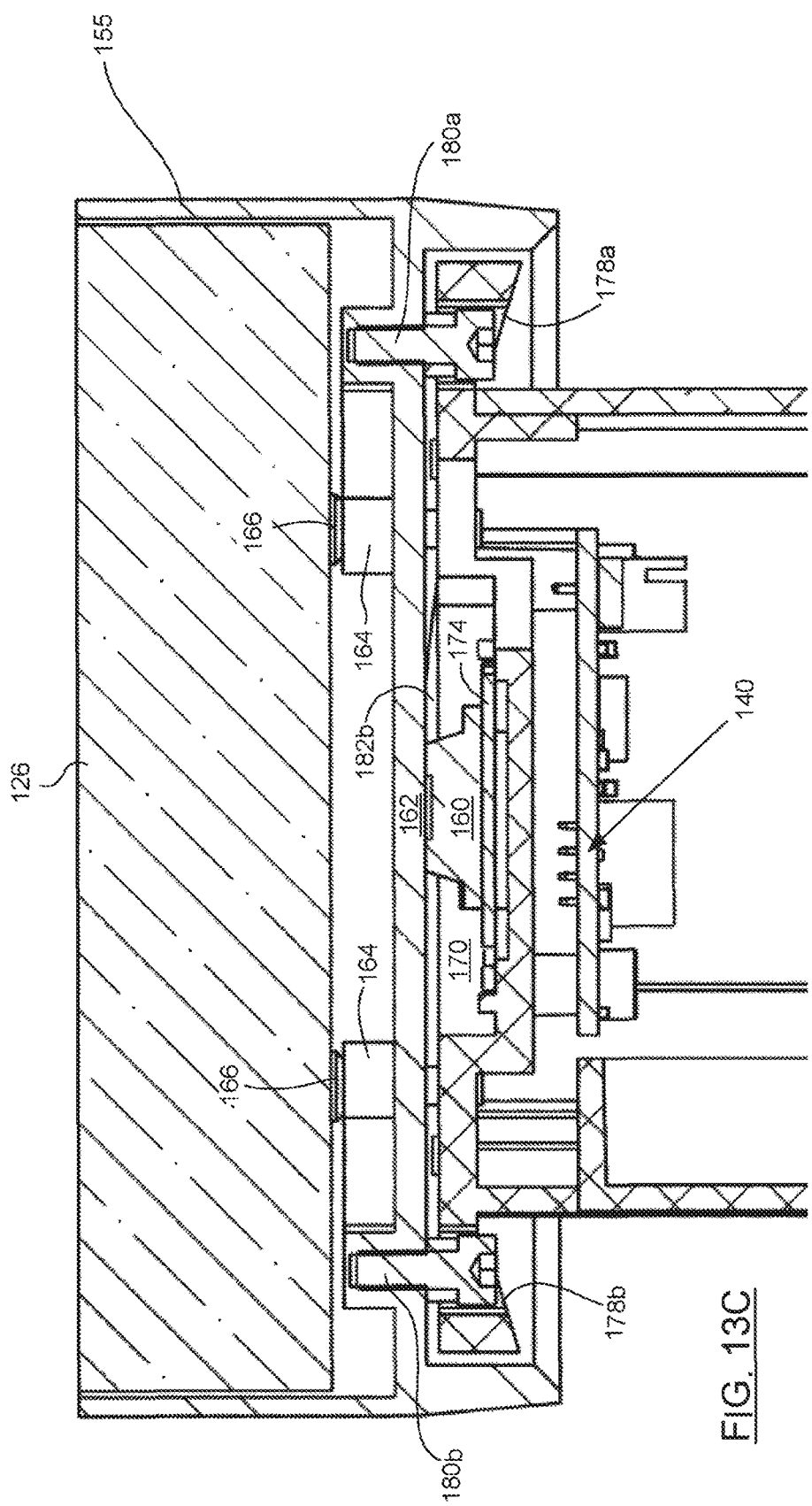
FIG. 13C is a cross sectional view through an upper part of the power outlet sub-assembly of FIG. 13.

FIGS. 13A and 13B are more detailed views of the cup 155, cover 140 and load cell 160 with FIG. 13B being a close up of the circular region "A" indicated in FIG. 13A. FIG. 13C is a cross section view through the line B-B' of FIG. 13B.

Referring now to FIG. 13B, the floor 162 of cup 155 is formed with four bosses 164 having threaded bores 168 formed into them that receive disk height adjustment screws 166 (FIG. 12A). Accordingly, by rotating the height adjustment screws the plug 126, which rests on the heads of the screws 166 may be levelled flush with the upper edge of cup 155. The cover 140 is formed with a central recess 170 about which are located clips 172 for holding a base 174 of the load cell 160 in place in the recess. A hole 176 is formed through the bottom of the recess 170 allowing electrical terminals of the load cell 160 to be connected to the PCB 142, which is attached to the underside of the cover 140.

It is important that relative movement be possible between the underside of the base of cup 155 and the top of the load cell so that downward force on the top side of the disk 126 can force the underside of the base 162 downward on the load cell 160 to thereby change the load cell's electrical state. In order to allow for the relative movement the cover 140 is integrally formed with two pairs of resilient supports, being a first pair 178a, 178b and a second pair

180a, 180b. Each of the resilient supports comprise tongues that have one end continuous with or fastened to the cover 140 so that their remote ends which are sized to stand proud of the surrounding cover, are spring-like. The first pair 178a, 178b of the resilient supports are formed with holes 177a, 177b through them for the passage of cup attachment screws 180a, 180b. Points of the cup attachment screws 180a, 180b are received into threaded holes formed in the underside of the base 162 of cup 155.

Accordingly, the base of the cup 155 sits upon, and is fastened to, the resilient supports 178a, 178b. The base also sits upon the second pair of resilient supports 182a, 182b.

Cover 140 is fastened to the top of the slider extrusion 146 by means of screws 158 which extend through holes 159 formed through the cover into the upper ends of longitudinal channels 184 (FIG. 13) formed along the inside of the arcuate extrusion 146. The load cell 160 causes motor 144 to operate via a control circuit of the PCB 142 that results in the motor rotating in alternate directions in response to successive applications of force from a user that change the electrical state of the load cell 160. During installation of the CPOA 127 a disk 126 of material of the bench may be placed in the cup 155 so that a seamless appearance is provided when the CPOA 27 is in the retracted configuration. A cylindrical sleeve 139 mounts into the top of flange 137 and encircles holder 155 in use in the retracted configuration shown in FIG. 14.

Figure 15:
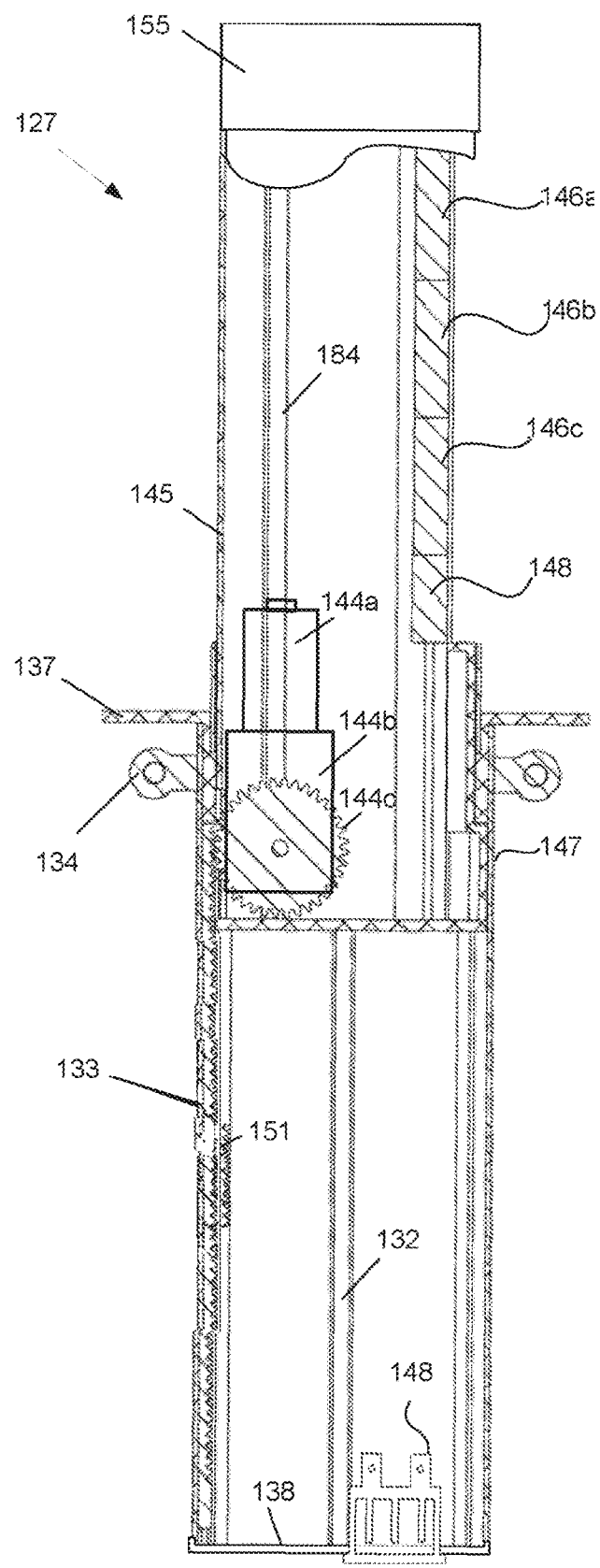
FIG. 15 corresponds to FIG. 14 with the CPOA in an extended configuration.

Teeth of the pinion 144c extend through an opening 130 (FIG. 14) formed in slider extrusion 146 to mesh with the rack 151, as best seen in FIGS. 14 and 15.

Figure 18:
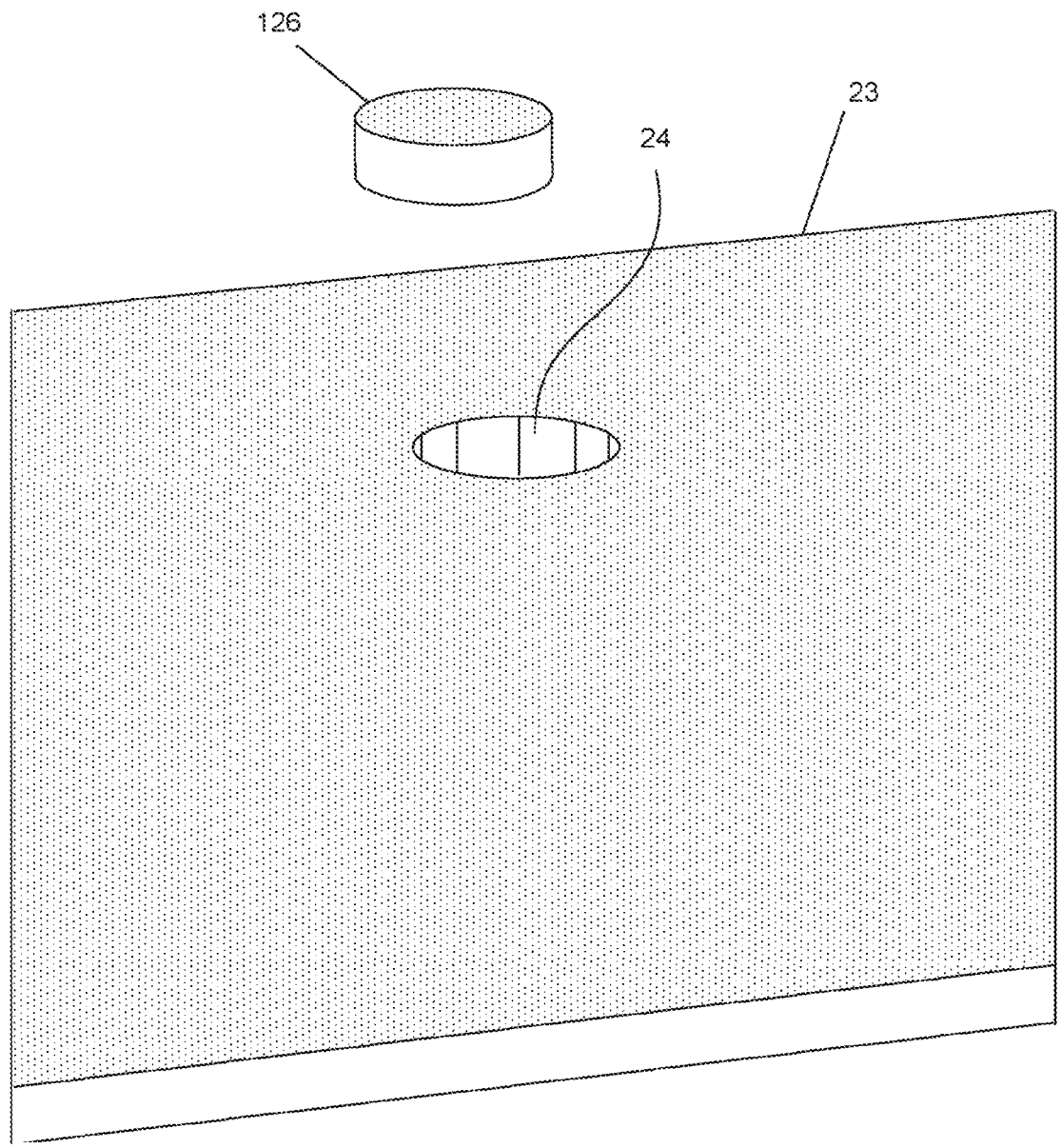
FIG. 18 Is a diagram showing how the disk of material of the CPOA of the preferred embodiment of the invention may be removed from to make a hole through a bench for mounting of the CPOA.

With reference to FIG. 18, in order to install the CPOA 127 in a bench 23 a tradesperson firstly makes a hole 24 corresponding to the inner diameter of the tubular housing 33 through the bench. Depending on how the hole is cut it may produce a disk of bench material 126 which is suitable for placement in the holder 155 as shown in FIGS. 14 and 15. Alternatively, the disk of bench material 126 may be produced separately, for example in the factory where the bench is manufactured.

Figure 16:
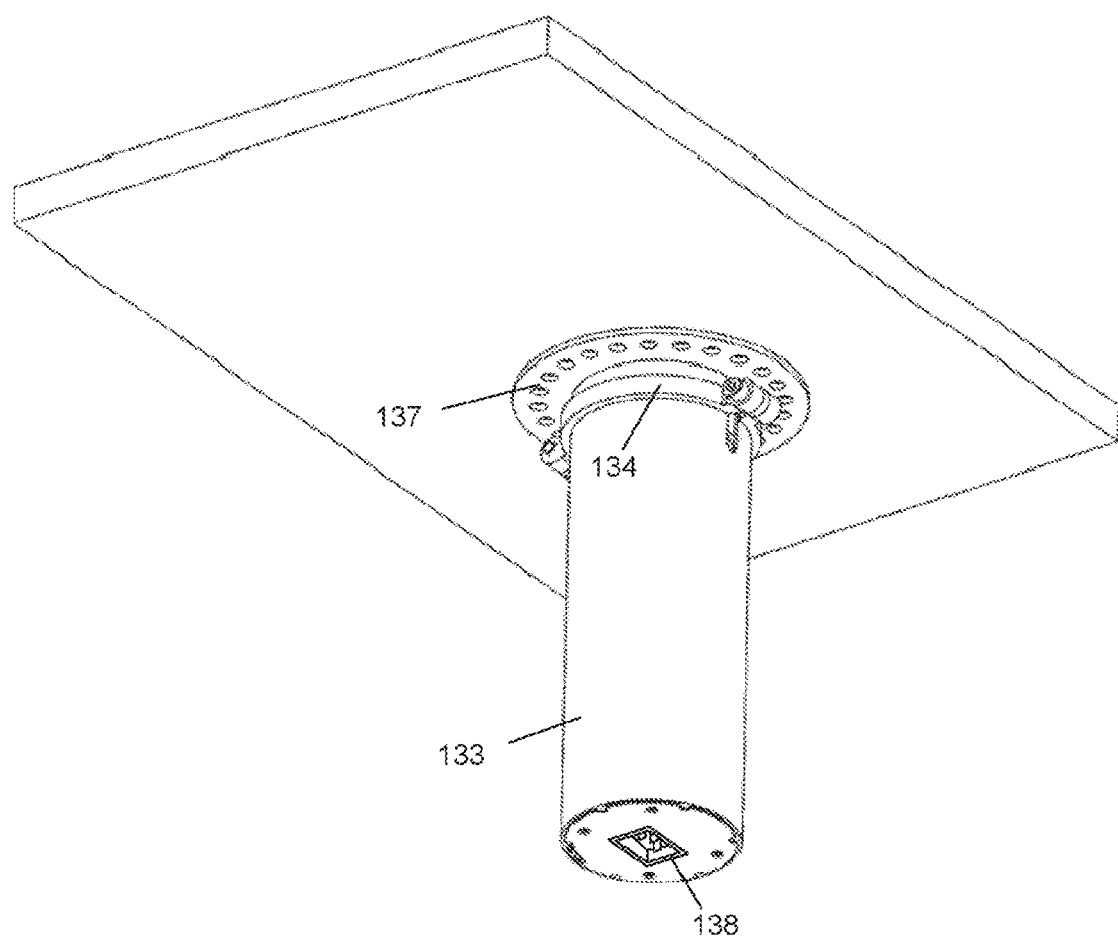
FIG. 16 is an underside view of the installed CPOA of FIG. 15A.

The flange 137 of the housing is fastened to the underside of the bench about the hole 24 with epoxy resin as shown in FIG. 16. The holder tube 133, containing the power outlet sub-assembly 131 is then attached to the underside of the flange and rotated to point the GPOs 146a, 146b and 146c in a desired direction. The clamp 134 is then tightened to ensure that the holder tube 133 is fastened securely in place. Electrical power cables similar to cables 53 (visible in FIG. 12) are connected to the premise's power supply in order to supply electricity to the GPOs 146a, 146b, 146c and also to a power supply circuit for the motor 144a. It will be realized that by making the housing 129 in two parts, i.e. with a separate flanged collar and tubular body, the flanged collar may firstly be mounted to the underside of the bench and then, once the flanged collar is securely in place, the tubular body may be clamped to the collar portion of the flanged collar at a desired orientation so that the GPO outlets face in the desired direction when the apparatus is brought to the extended configuration that is shown in FIG. 15.

Figure 15A:
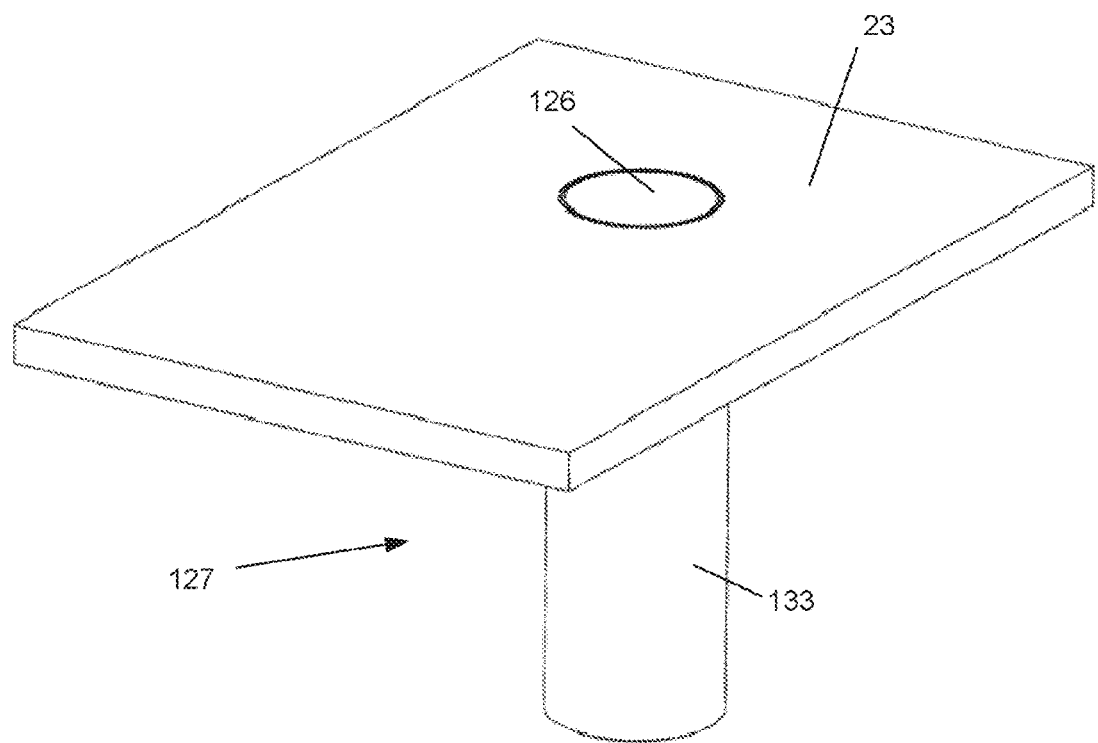
FIG. 15A shows the CPOA of FIG. 13 installed to the bench.

FIG. 15A is a view of the top of the bench 23 with the CPOA 127 installed and shown in the retracted configuration. It will be noted that since the holder 155 holds a disk 126 of the bench material the overall impression of the bench top will be that it is virtually seamless and the installation of the CPOA 127 makes little visual impact in the retracted configuration, which is highly desirable.

Upon pushing down on the disk of bench material 126, which is located in the holder 155, the base 162 of the holder overcomes the upward basing force of the resilient supports 178a, 178b and 182a, 182b so that the underside of the base 162 of cup 155 exerts pressure on the load cell 160 thereby causing it to change its electrical characteristics. The load cell 160 generates a low voltage signal that the control circuit of PCB 142 responds to by activating the motor 144a so that pinion 144c turns and, due to its engagement with rack 151, brings the CPOA 127 to the extended configuration that is shown in FIGS. 15 and 17. In the extended configuration the GPOs 146a, 146b, 146c are accessible as shown in FIG. 17 and can receive power plugs 50a, 50b, 50c (illustrated in FIG. 12) for benchtop appliances.

When it is time to return to the retracted configuration the power plugs 50a, 50b, 50c are removed and downward force is then applied to the disk 126 so that load cell 160 is again activated to thereby operate the motor 144a and the pinion 144c in an alternate direction to thereby bring the CPOA 127 to the retracted configuration illustrated in FIG. 14.

It will be realized that embodiments of the invention provide a concealable power outlet assembly for mounting under a benchtop which is an improvement to the previously described concealable power outlet assembly of the prior art since the user does not have to pull the outlets up out of the bench. Furthermore, the upper holder receives bench material that matches the surrounding bench so that in the retracted configuration the power outlet assembly makes little visual impact. In addition, embodiments of the invention are convenient for a user to operate since they need to merely push down upon the bench material that is mounted to the top of the power outlet assembly in order to either unlatch the gas strut or operate the electric motor to bring the assembly from its retracted configuration to its extended configuration for use. Consequently there is no need for a separate and unsightly electrical switch or push button to operate the apparatus.

The preferred activation sensor of the preferred embodiment, illustrated in FIG. 13, is a load cell but it will be realized that other activation sensors such as a micro switch or a momentary push button switch may also be used with suitable arrangement of the control circuitry of PCB 142. Where a momentary push button switch with internal biasing of the switch button is used then the biasing supports on the cover 140 will not be necessary.

It will be realized that by locating the load cell in a recess formed on one side of the cover with the PCB mounted on the underside of the cover a compact arrangement is provided for sensing user operation force directly on the disk 126 that is held in the cup 155. The cover 140 is arranged to not only provide a mounting platform for both the load cell and the PCB 142 but also to provide the resilient supports 178a, 178b and 182a, 182b that bias the base 162 of the cup 155 away from the load cell so that it is only upon application of user force downwardly to the cup 155 that the biasing of the supports is overcome and the load cell is operated for alternatively causing the extension and withdrawal of the slider assembly.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described herein comprises preferred forms of putting the invention into effect. The invention is, therefore, claimed in any of its forms or modifications within the proper scope of the appended claims appropriately interpreted by those skilled in the art.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the specification and claims (if present), unless the context requires otherwise, the term "substantially" or "about" will be understood to not be limited to the value for the range qualified by the terms.

Any embodiment of the invention described in the detailed description is meant to be illustrative only and is not meant to be limiting to the invention.

The invention claimed is:

1. A concealable power outlet assembly for bench mounting comprising:
   a housing for mounting fast with an underside of the bench;
   a power outlet sub-assembly slideably received by the housing and comprising an upper portion, wherein the upper portion comprises a holder for supporting a portion of bench material flush with an upper side of the bench;
   a sensor comprising a load cell responsive to operative force applied to the upper portion;
   an extension assembly comprising an electric actuator responsive to the sensor for sliding the power outlet sub-assembly relative to the housing in response to application of operative force to the upper portion to thereby bring said sub-assembly to an extended configuration or to a retracted configuration;
   a biasing arrangement spacing the sensor from the upper portion in the absence of the operative force wherein upon application of operative force to the holder the biasing arrangement is overcome for operation of the sensor by the upper portion; and,
   a mounting plate wherein the biasing arrangement comprises a number of resilient supports fast with the mounting plate.

2. The assembly according to claim 1, wherein the mounting plate comprises a recess in Which the sensor is located.

3. The assembly according to claim 2, wherein the recess comprises a hole formed therethrough.

4. The assembly according to claim 3, wherein a printed circuit board bearing comprising a control circuit is mounted to an underside of the mounting plate and in electrical communication with the sensor.

5. The assembly according to claim 4, wherein the power outlet sub-assembly comprises an extrusion that slides within the housing and the mounting plate is mounted atop the extrusion.

6. The assembly according to claim 1, wherein the housing comprises a collar with a flange and a tubular body and wherein in use the flange is adhered to the underside of the bench and the tubular body is clamped to the collar, whereby the tubular body is rotatable to a desired angle relative to the flanged collar prior to clamping thereto.

7. The assembly according to claim 1, wherein the electric actuator comprises a motor that drives a pinion that meshes with a rack.

8. The assembly according to claim 7, wherein the electric motor is mounted in the power outlet subassembly and the rack is mounted to the housing.

9. The assembly according to claim 1, wherein the power outlet subassembly comprises first and second rails that respectively cooperate with first and second guides disposed along internal walls of the housing.

10. The assembly according to claim 9, wherein the power outlet sub-assembly further comprises a spacing member that holds the first and second rails apart.

11. The assembly according to claim 10, wherein the spacing member comprises an arcuate extrusion.

12. The assembly according to claim 11, further comprising a base-plate mounted to the arcuate extrusion for adding rigidity thereto.

13. The assembly according to claim 12, wherein the base plate comprises an opening formed therethrough for passage of electrical wiring.

14. The assembly according to claim 13, wherein a number of electrical outlets of the power outlet sub-assembly are disposed between opposed sides of the rails.

15. The assembly according to claim 1, wherein electrical outlets of the power outlet sub-assembly comprise one or more of a general purpose outlet (GPO), electrical sockets, or data network ports.

* * * * *